United States Patent
Minegishi et al.

(10) Patent No.: US 7,611,656 B2
(45) Date of Patent: Nov. 3, 2009

(54) METHOD AND DEVICE FOR FABRICATING PLASTIC MOLDED ARTICLE

(75) Inventors: Daiki Minegishi, Kanagawa (JP); Hisaaki Koseko, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 758 days.

(21) Appl. No.: 11/130,166

(22) Filed: May 17, 2005

(65) Prior Publication Data
US 2005/0258573 A1    Nov. 24, 2005

(30) Foreign Application Priority Data
May 18, 2004    (JP)    ............... 2004-147264

(51) Int. Cl.
*B29C 67/00* (2006.01)
(52) U.S. Cl. .................. 264/449; 264/437; 264/438; 264/439; 264/440; 264/108
(58) Field of Classification Search ................. 264/449, 264/451, 435–440, 460, 463, 479, 480, 484
See application file for complete search history.

(56) References Cited

U.S. PATENT DOCUMENTS 5,929,960 A * 7/1999 West et al. .................. 349/156

FOREIGN PATENT DOCUMENTS

JP    5-185464    7/1993

* cited by examiner

*Primary Examiner*—Philip C Tucker
*Assistant Examiner*—Xue Liu
(74) *Attorney, Agent, or Firm*—Oblon, Spivak, McClelland, Maier & Neustadt, L.L.P.

(57) ABSTRACT

A method of fabricating a plastic molded article is disclosed. In the method, a compound liquid, including two component liquids insoluble in each other and having different dielectric constants, is supplied between two electrodes, and an electric field is applied between the electrodes. At least one of the component liquids is an un-cured curable resin liquid. Upon application of the electric field, the higher dielectric constant component liquid is extended along the direction of the electric field, thus forming a bridge structure linking the electrodes. When the curable resin is cured after the bridge structure is formed, a plastic molded article is obtained.

22 Claims, 22 Drawing Sheets

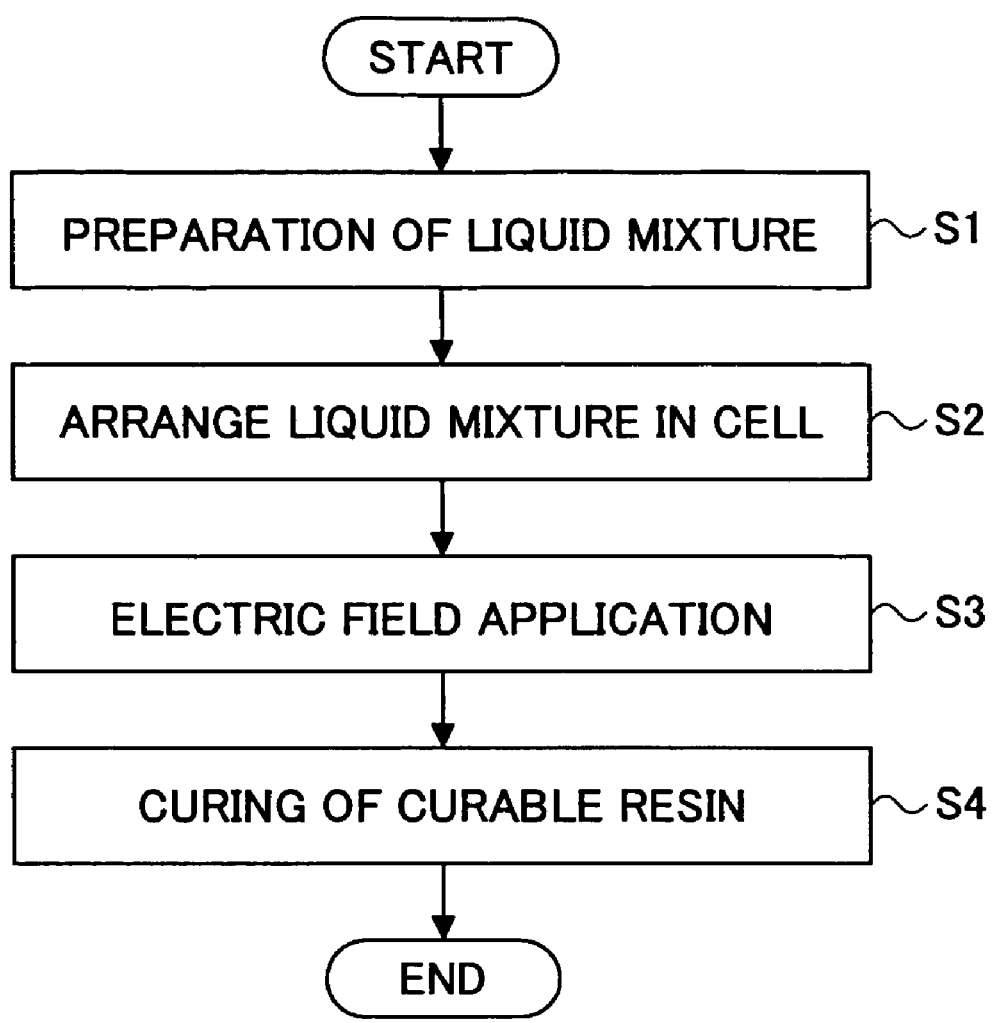

ELECTRIC FIELD OFF : LAYERED STATE

ELECTRIC FIELD ON : BRIDGE STRUCTURE

ELECTRIC FIELD OFF : DROPLET STATE

ELECTRIC FIELD ON : BRIDGE STRUCTURE

ELECTRIC FIELD OFF : DISPERSED STATE

ELECTRIC FIELD ON : BRIDGE STRUCTURE

IRRADIATION

REMOVAL OF DISPERSED SOLVENT

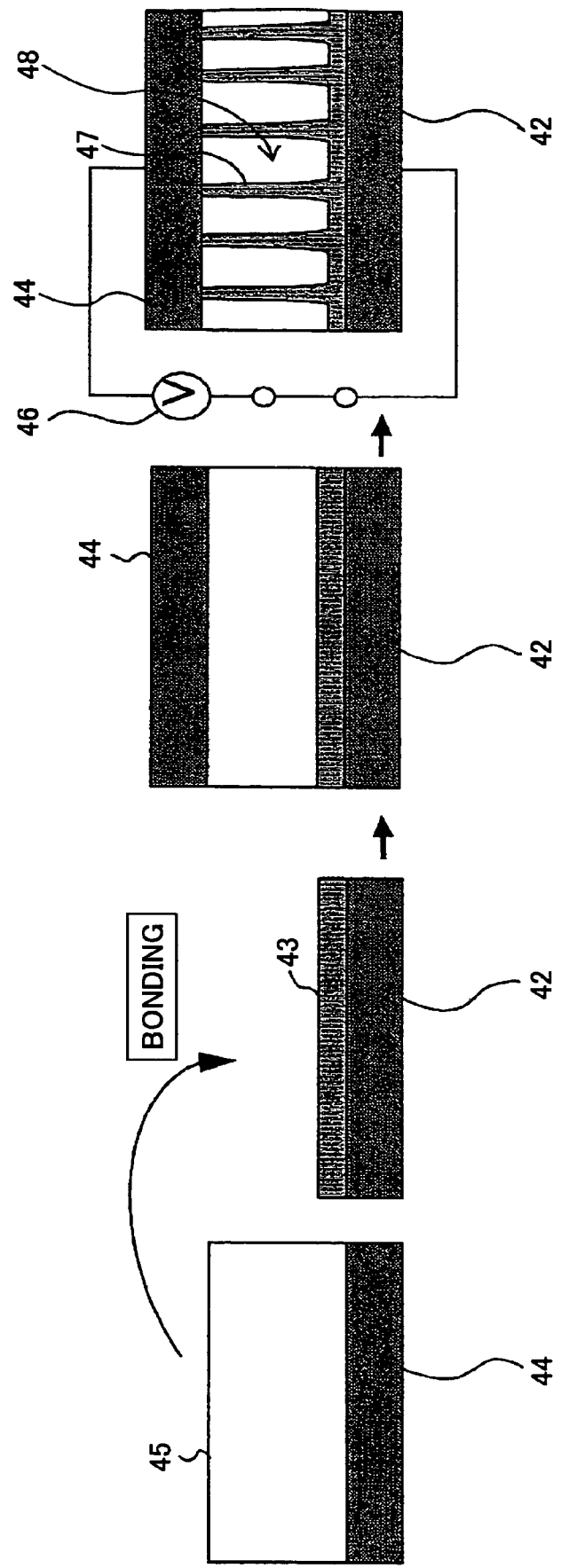

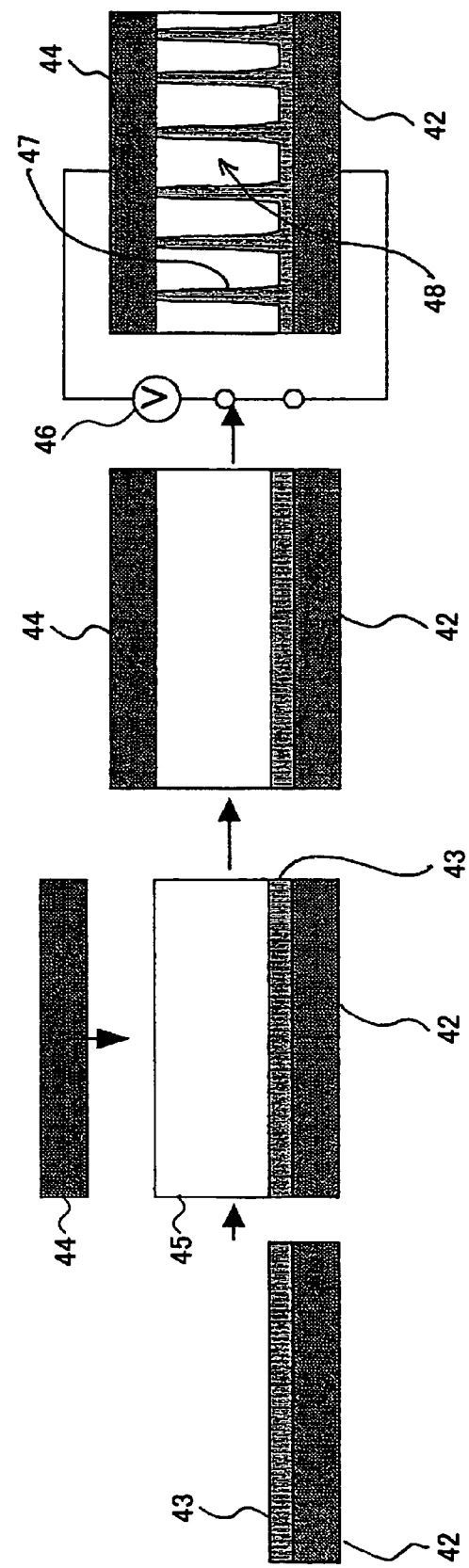

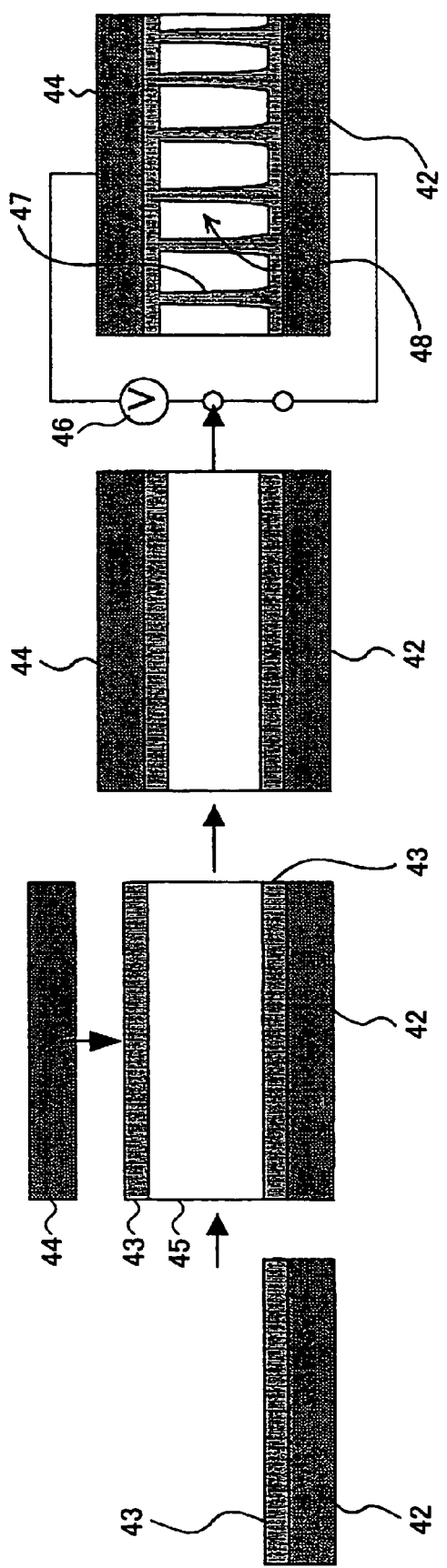

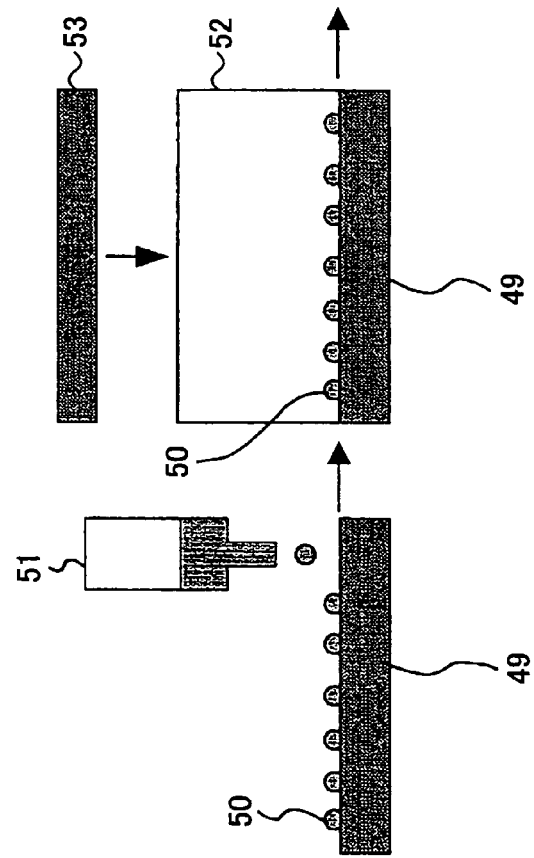
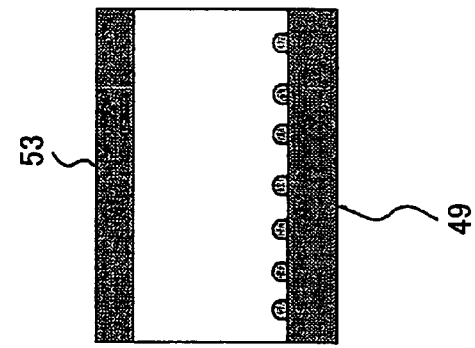
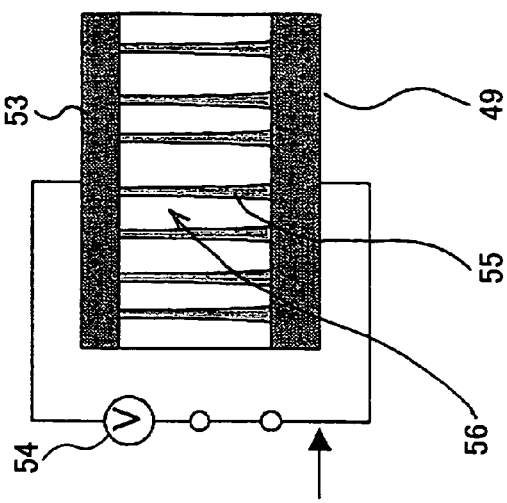
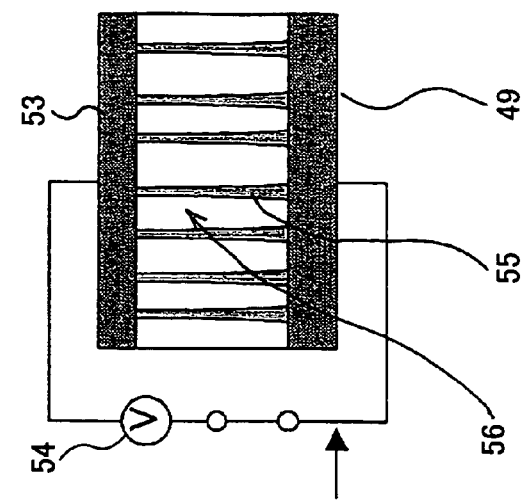

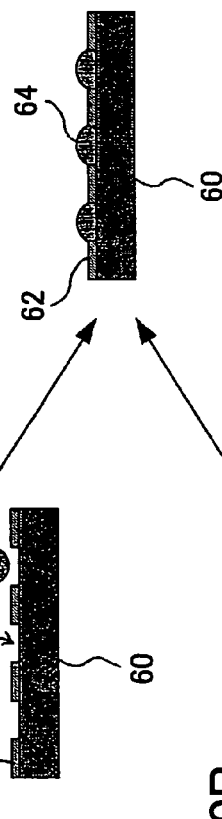
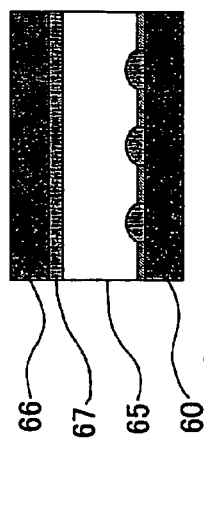
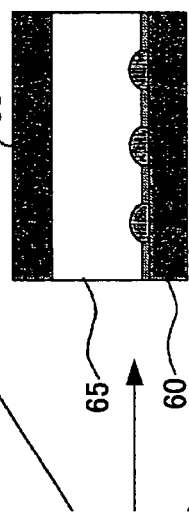
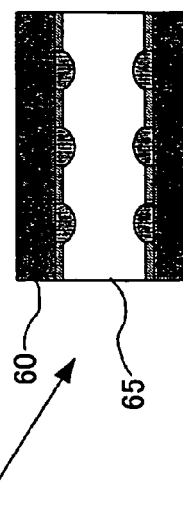
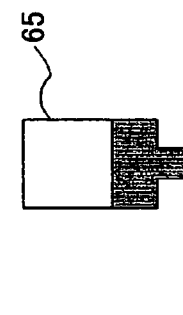

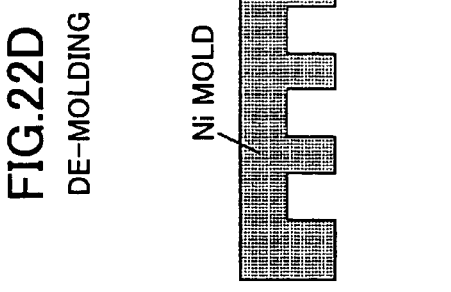
FIG.22A EXPOSURE
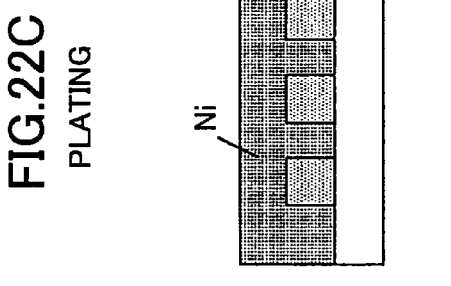
FIG.22B DEVELOPING
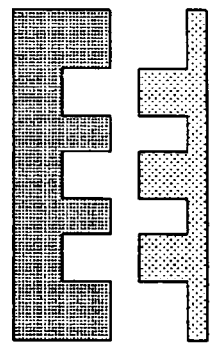
FIG.22C PLATING
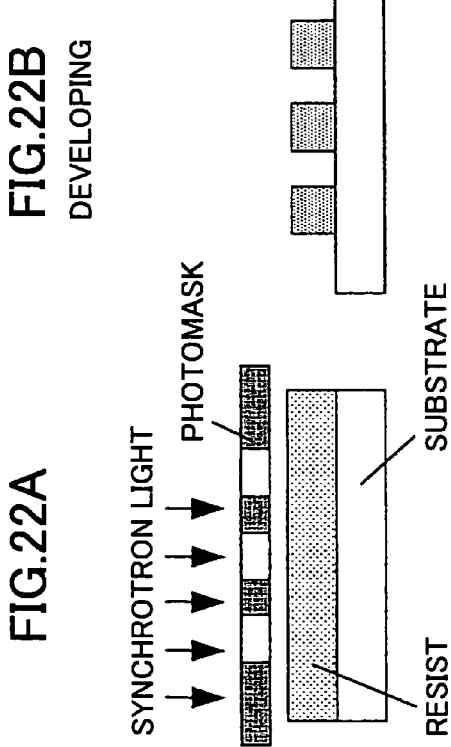
FIG.22D DE-MOLDING
FIG.22E EMBOSS
FIG.22F HOT EMBOSS (HEATING PRESSURE)
FIG.22G DE-MOLDING
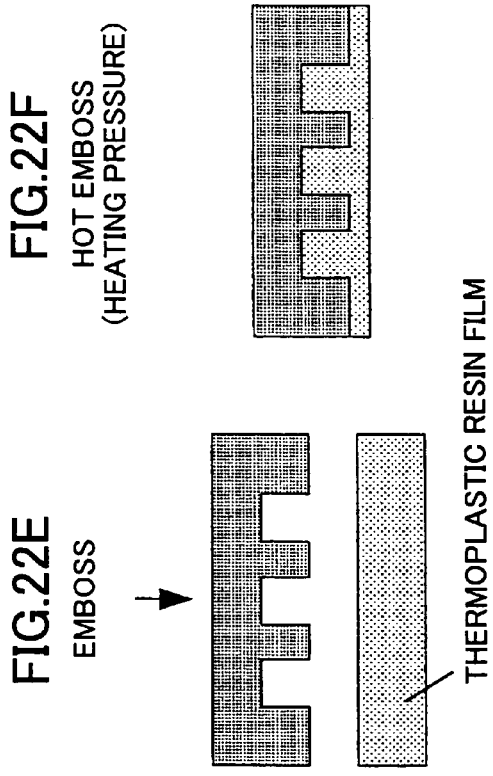

REMOVE UN-CURED RESIN

WRITE A THIRD AND SUBSEQUENT LAYERS

DESCEND SUBSTRATE, WRITE A SECOND LAYER

WRITE A FIRST LAYER (LIGHT CURING)

LASER
CURABLE RESIN
SUBSTRATE
UN-CURED RESIN

METHOD AND DEVICE FOR FABRICATING PLASTIC MOLDED ARTICLE

BACKGROUND OF THE INVENTION

1. Field of the Invention

The present invention relates to a technique of fabricating a plastic molded article applicable to fabrication of a minute or small structure in the order of μm to nanometers.

2. Description of the Related Art

In the related art, the following techniques are well known for fabricating a plastic molded article (synthesized resin product).

(1) Injection Molding

Specifically, after filling a mold with a melted resin, the melted resin is cooled to obtain a plastic molded article. For example, reference can be made to Japanese Laid Open Patent Application No. 5-185464.

(2) Photolithography

FIG. 21A through FIG. 21C are cross-sectional views schematically illustrating a method of fabricating a plastic molded article by photolithography.

As illustrated in FIG. 21A through FIG. 21C, a thin film formed from a synthesized resin on the surface of a substrate is partially removed by light with a photo resist above the thin film as a photo mask, and a thin film product is obtained to have a two dimensional shape corresponding to the mask, as shown in FIG. 21C.

(3) LIGA Process

FIG. 22A through FIG. 22G are cross-sectional views schematically illustrating a method of fabricating a plastic molded article by a LIGA process.

As illustrated in FIG. 22A through FIG. 22G, lithography is performed by using synchrotron radiation of high directionality, resulting in a high-aspect-ratio molded article having unevenness. After plating and de-molding this molded article having unevenness, a mold is obtained. Then, while this mold is being heated, this mold is pressed against a thermoplastic resin (hot embossing), and a plastic molded article is produced which has a shape corresponding to that of the molded article having unevenness, as shown in FIG. 22G.

(4) Rapid Prototyping Process

FIG. 23A through FIG. 23D are cross-sectional views schematically illustrating a method of fabricating a plastic molded article by a Rapid Prototyping process.

First, three dimensional CAD data of a product to be fabricated are split into thin sectional slices to convert the three dimensional CAD data into contour data. Then, as illustrated in FIG. 23A through FIG. 23D, based on the contour data, an un-cured light curable resin is irradiated by a laser beam to cure the light curable resin step by step, with a thin layer of the light curable resin being irradiated and cured in each step. Then, the un-cured light curable resin is removed after the cured portions of the thin layers are stacked, thus, a solid plastic molded article is obtained, as shown in FIG. 23D.

However, as for the above-described method (1), namely, injection molding, although productivity of the method is excellent, this method is not suitable for experimental production; hence, it is difficult to use this method to form minute shapes.

Concerning the above-described method (2), namely, photolithography, this method requires expensive production equipment, while only being capable of fabricating molded articles not thicker than a few tens μm. Further, this method requires waste disposal accompanying development treatment.

As for the above-described method (3), namely, the LIGA process, the synchrotron radiation equipment is quite expensive, even though the mold is ordered from an outside supplier, the cost is still very high.

Concerning the above-described method (4), namely, the rapid prototyping process, this method is quite effective for produce a complicated three dimensional minute shape, but it is quite time-consuming even when fabricating a single article; especially, productivity of this method is quite poor when fabricating an article of a single shape and large area.

SUMMARY OF THE INVENTION

Accordingly, it is a general object of the present invention to solve one or more problems of the related art.

A specific object of the present invention is to provide a method and a device able to ease fabrication of a plastic molded article having a minute shape, and the plastic molded article.

According to a first aspect of the present invention, there is provided a method of fabricating a plastic molded article, comprising the steps of filling an electric field application cell with a compound liquid, said electric field application cell having electrodes facing each other, said compound liquid including at least two component liquids insoluble in each other and having dielectric constants different from each other, at least one of the component liquids being an un-cured curable resin liquid; applying an electric field between the electrodes to concentrate and extend one of the component liquids in the compound liquid along a direction of the electric field so as to form a bridge structure linking the electrodes, said one of the component liquids being a high dielectric constant component liquid that has a dielectric constant higher than the dielectric constants of other component liquids; and curing the curable resin after the bridge structure is formed to obtain the plastic molded article.

According to the present invention, because a bridge structure obtained by utilizing the Electrorheology (ER) effect, as described below, is fixed by a curable resin, it is possible to easily fabricate a minute structure in the order of μm to nanometers.

In the related art, for example, referring to FIG. 21A through FIG. 21C, which schematically illustrate a method of fabricating a plastic molded article by means of photolithography, specifically, patterning of a negative resist, when it is desired to fabricate a structure of high perpendicularity with the negative resist, because ultraviolet rays have to be irradiated on a sample through a photo mask having the patterned shape, due to influence of contact between the sample and the photo mask, directionality or incidence angle of the ultraviolet rays become significant, and additionally, expensive equipment is required.

In contrast, in the present invention, because of the Electrorheology effect, the high dielectric constant component liquid is concentrated and automatically extended along the direction of the electric field, and it is sufficient to just fix the bridge structure by a curable resin; hence, it is not necessary to consider conditions such as directionality or incidence angle of the ultraviolet rays, and it is possible to fabricate a plastic molded article precisely and very easily with low cost.

As an embodiment, the component liquids are dispersions prepared by dispersing the component liquids in separate steps.

Alternatively, as an embodiment, the component liquids are supplied in the electric field application cell without being dispersed.

According to the present invention, with the component liquids being supplied in the electric field application cell without being dispersed, when applying the electric field to form the bridge structure, the bridge structure can be completely built and no residual liquid droplet of the high dielectric constant component liquid remains in the compound liquid. In other words, it is possible to fabricate a plastic molded article with the high dielectric constant component liquid being in a limited region.

The thus fabricated plastic molded articles can be used in light guides, diffractive grating optical elements, wave plates, spacers, minute cells, and so on.

In the embodiment, the component liquids are stacked to be a layered structure. Or, in the embodiment, the high dielectric constant component liquid is formed on one surface of the electrodes in the form of droplets.

According to the present invention, it is possible to selectively form the bridge structure toward places where the droplets are present.

As an embodiment, the step of filling the electric field application cell with the compound liquid having the layered structure may include the steps of forming a layer of one of the component liquids on a first electrode of the electric field application cell; forming a layer of other one of the component liquids on a second electrode of the electric field application cell; and bonding the first electrode with the one component liquid layer formed thereon and the second electrode with the other one component liquid layer formed thereon.

As an embodiment, the step of filling the electric field application cell with the compound liquid having the layered structure includes the steps of forming a layer of one of the component liquids on a first electrode of the electric field application cell; forming a layer of another one of the component liquids on the layer of the one component liquid; and bonding a second electrode of the electric field application cell on the layer of the other one of the component liquids.

As an embodiment, the high dielectric constant component liquid is injected onto the surface of one of the electrodes to form the droplets.

As an embodiment, the droplets of the high dielectric constant component liquid on the surface of one of the electrodes are obtained by a step of forming a first film having a predetermined pattern on the surface of one of the electrodes from a material repelling the high dielectric constant component liquid, and a step of forming a film from the high dielectric constant component liquid on the first film.

As an embodiment, the step of filling the electric field application cell with the compound liquid includes the steps of forming the droplets of the high dielectric constant component liquid on a surface of a first electrode of the electric field application cell; forming a layer of another one of the component liquids other than the high dielectric constant component liquid on a second electrode of the electric field application cell; and bonding the first electrode with the high dielectric constant component liquid formed thereon and the second electrode with the other one component liquid layer formed thereon.

As an embodiment, the step of filling the electric field application cell with the compound liquid includes the steps of forming the droplets of the high dielectric constant component liquid on a surface of a first electrode of the electric field application cell; forming a layer of another one of the component liquids other than the high dielectric constant component liquid on the droplets of the high dielectric constant component liquid; and bonding a second electrode of the electric field application cell on the layer of the other one component liquid.

As an embodiment, the curable resin is cured when being irradiated by rays of activation energy.

As an embodiment, the curable resin is an ultraviolet curable resin which is cured when being irradiated by ultraviolet rays.

As an embodiment, the curable resin is a thermal curable resin which is cured when being heated.

As an embodiment, the compound liquid includes two component liquids which are insoluble in each other and have dielectric constants different from each other.

As an embodiment, the high dielectric constant component liquid of the two component liquids is an un-cured curable resin; and one of the two component liquids having a relatively low dielectric constant is removed after the curable resin is cured.

According to the present invention, because the high dielectric constant component liquid is a curable resin, and the other component liquid is removed after the curable resin is cured, it is possible to fabricate a columnar curable resin molded article with high precision.

As an embodiment, one of the two component liquids having a relatively low dielectric constant is an un-cured curable resin; and the high dielectric constant component liquid is removed after the curable resin is cured.

According to the present invention, because the low dielectric constant component liquid is a curable resin, and the other component liquid is removed after the curable resin is cured, it is possible to fabricate a curable resin molded article having openings with high precision.

As an embodiment, the high dielectric constant component liquid in the two component liquids is a first un-cured curable resin; one of the two component liquids having a relatively low dielectric constant is a second un-cured curable resin; and the second curable resin and the first curable resin are cured after the bridge structure is formed.

As an embodiment, the high dielectric constant component liquid in the two component liquids is an un-cured curable resin; one of the two component liquids having a relatively low dielectric constant is a melt of a thermo-melting material that melts when being heated; and the melt of the thermo-melting material is cured after the curable resin is cured.

As an embodiment, the high dielectric constant component liquid in the two component liquids is an un-cured curable resin; one of the two component liquids having a relatively low dielectric constant is a melt of a thermo-melting material that melts when being heated; and the curable resin is cured after the melt of the thermo-melting material is cured.

As an embodiment, one of the two component liquids having a relatively low dielectric constant is an un-cured curable resin; the high dielectric constant component liquid in the two component liquids is a melt of a thermo-melting material that melts when being heated; and the melt of the thermo-melting material is cured after the curable resin is cured.

As an embodiment, one of the two component liquids having a relatively low dielectric constant is an un-cured curable resin; the high dielectric constant component liquid in the two component liquids is a melt of a thermo-melting material that melts when being heated; and the curable resin is cured after the melt of the thermo-melting material is cured.

According to the present invention, because the compound liquid includes two kinds of curable resins, or includes a curable resin and a thermo-melting material, one of the components constitutes a columnar portion, and the other one of the components constitutes the periphery of the columnar portion; hence, it is possible to fabricate a plastic molded article having anisotropy in the columnar portion and in the periphery of the columnar portion.

As an embodiment, the electric field between the electrodes is induced by an alternating current.

As an embodiment, the electric field between the electrodes is induced by a direct current.

According to a second aspect of the present invention, there is provided a device for fabricating a plastic molded article, comprising an electric field application cell having two electrodes facing each other, said electric field application cell being filled with a compound liquid including a plurality of component liquids, said component liquids being insoluble in each other and having dielectric constants different from each other, at least one of the component liquids being an un-cured curable resin liquid; and an electric field application unit configured to apply an electric field between the two electrodes, wherein the electric field application unit applies an electric field between the electrodes with the compound liquid being disposed between the electrodes to induce concentration and extension of one of the component liquids in the compound liquid along a direction of the electric field so as to form a bridge structure linking the electrodes, said one of the component liquids being a high dielectric constant component liquid that has a dielectric constant higher than the dielectric constants of other component liquids, the curable resin being cured after the bridge structure is formed.

According to a third aspect of the present invention, there is provided a device for fabricating a plastic molded article, comprising an electric field application cell having a first electrode and a second electrode facing each other, said electric field application cell being filled with a compound liquid including a plurality of component liquids, said component liquids being insoluble in each other and having dielectric constants different from each other, at least one of said component liquids being an un-cured curable resin liquid, a high dielectric constant component liquid among said component liquids being formed into the form of droplets on a surface of said first electrode, a layer of other one of said component liquids being formed to cover said droplets, said high dielectric constant component liquid having a dielectric constant higher than the dielectric constants of the other component liquids; and an electric field application unit configured to apply an electric field between the two electrodes, wherein the electric field application unit applies an electric field between the electrodes with the compound liquid being disposed between the two electrodes to induce concentration and extension of the high dielectric constant component liquid in the compound liquid along a direction of the electric field so as to form a bridge structure linking the two electrodes, the curable resin being cured after the bridge structure is formed.

According to a fourth aspect of the present invention, there is provided a plastic molded article fabricated by a method comprising the steps of filling an electric field application cell with a compound liquid, said electric field application cell having electrodes facing each other, said compound liquid including at least two component liquids insoluble in each other and having dielectric constants different from each other, at least one of the component liquids being an un-cured curable resin liquid; and applying an electric field between the electrodes to concentrate and extend one of the component liquids in the compound liquid along a direction of the electric field so as to form a bridge structure linking the electrodes, said one of the component liquids being a high dielectric constant component liquid that has a dielectric constant higher than the dielectric constants of other component liquids; and curing the curable resin after the bridge structure is formed to obtain the plastic molded article.

According to the present invention, it is possible to easily fabricate a plastic molded article having a minute shape.

These and other objects, features, and advantages of the present invention will become more apparent from the following detailed description of preferred embodiments given with reference to the accompanying drawings.

BRIEF DESCRIPTION OF THE DRAWINGS

FIG. 1 is a flowchart schematically illustrating a method of fabricating a plastic molded article according to an embodiment of the present invention;

FIG. 13A through FIG. 13C are views schematically illustrating a process of fabricating a plastic molded article according to the example 11, in which a layered structure of a compound liquid is built in an electric field application cell;

FIG. 15A through FIG. 15D are views schematically illustrating a process of fabricating a plastic molded article according to the example 12, in which two liquid films are formed on one electrode sequentially;

FIG. 16A through FIG. 16D are views schematically illustrating another process of fabricating a plastic molded article according to the example 12, in which two liquid films are formed on one electrode sequentially;

FIG. 17A through FIG. 17D are views schematically illustrating a process of fabricating a plastic molded article according to the example 13, in which a high dielectric constant liquid is in the form of droplets on one electrode, and a low dielectric constant liquid is in the form of a thin film on another electrode;

FIG. 20A through FIG. 20F, continued from FIG. 19D, are views schematically illustrating steps of fabricating a plastic molded article according to the example 13;

FIG. 22A through FIG. 22G are cross-sectional views schematically illustrating a method of fabricating a plastic molded article by a LIGA process.

DESCRIPTION OF THE PREFERRED EMBODIMENTS

Below, preferred embodiments of the present invention are explained with reference to the accompanying drawings.

FIG. 1 is a flowchart schematically illustrating a method of fabricating a plastic molded article according to an embodiment of the present invention.

As illustrated in FIG. 1, in step S1, a dispersed compound liquid is prepared by mixing at least two component liquids. The component liquids are insoluble in each other, have dielectric constants different from each other, and at least one of the component liquids is an un-cured curable resin. Alternatively, the component liquids of the compound liquid are stacked to form a layered structure on one surface of the electrodes, or droplets of the component liquids are formed on the electrode surface, or layers of the component liquids are formed on another layer or on the droplets; thereby, the component liquids are arranged in appropriate positions.

In step S2, the compound liquid is disposed between electrodes of a device for applying an electric field to the compound liquid, for example, this device is referred to as an "electric field application cell".

In step S3, an electric field is applied to the compound liquid through the electrodes of the electric field application cell so as to form a bridge structure.

In step S4, the curable resin is cured under this condition, and a plastic molded article is obtained.

Here, the so-called "bridge structure" is a state of one of the component liquids having a high dielectric constant, in which the high dielectric constant component liquid is concentrated and extended in the direction of the electric field to link the two electrodes. Such a bridge structure is obtainable by utilizing the electrorheology (ER) effect.

Figure 2A:
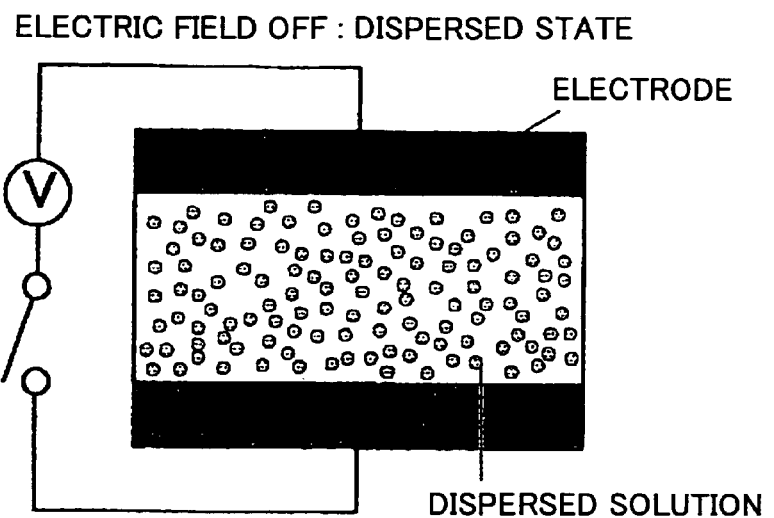
FIG. 2A through FIG. 2C schematically illustrate the ER effect.
Figure 2B:
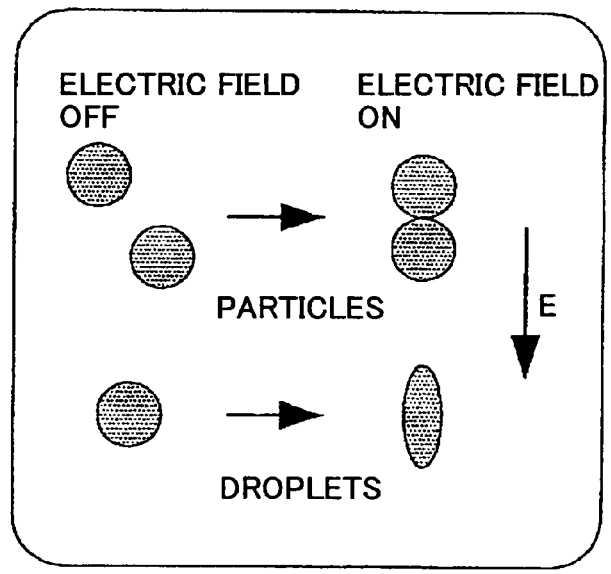
Figure 2C:
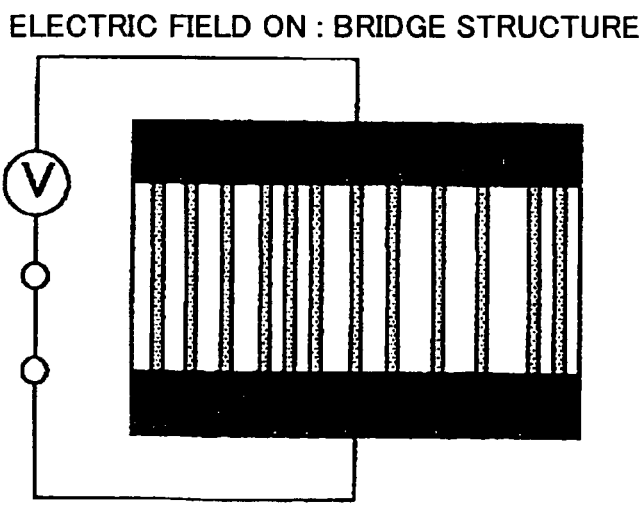

FIG. 2A through FIG. 2C schematically illustrate the ER effect.

As shown in FIG. 2A, in the ER effect, particles having a dielectric constant higher than that of a dispersed solvent are dispersed in the dispersed solvent. This is a so-called "solid-liquid phase", for example, reference can be made to E. N. da Andrade et al., Nature, 143, pp 3610, 1939. Or a liquid having a dielectric constant higher than that of the dispersed solvent is dispersed into minute droplets by agitation. This is a so-called "liquid-liquid phase", for example, reference can be made to K. Tajiri et al., J. Rheol., 41(2), p. 335, 1997.

As shown in FIG. 2B and FIG. 2C, an electric field E in units of V/μm is applied to the dispersed solution, and due to this, the particles or droplets of a high dielectric constant are tied up, or the droplets are deformed along the direction of the electric field E to be tied up, thereby forming a bridge structure linking the electrodes, consequently resulting in increase of viscosity of the dispersed solution.

Alternatively, the dispersed solute having a high dielectric constant and the dispersed solvent having a low dielectric constant, which are component liquids constituting the compound liquid, can be separately fabricated to be layer structures.

Figure 3A:
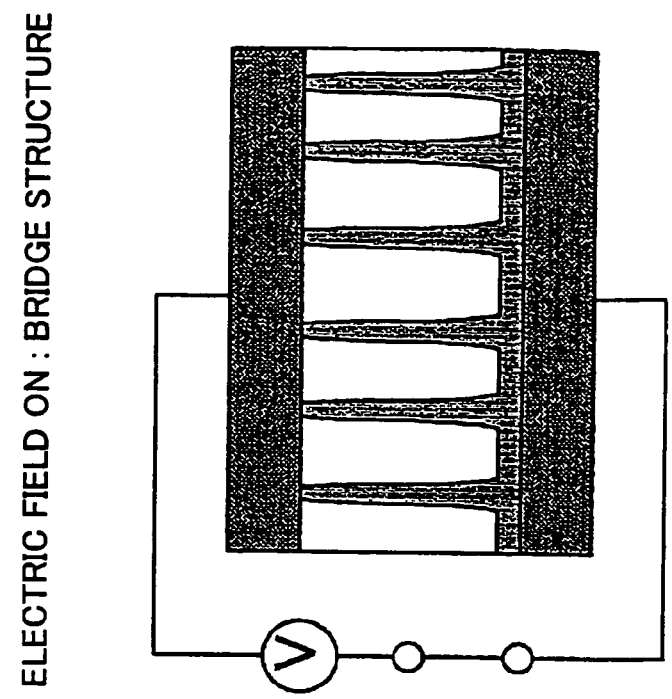
FIG. 3A and FIG. 3B schematically illustrate the ER effect when the component liquids of the compound liquid have layer structures.
Figure 3B:
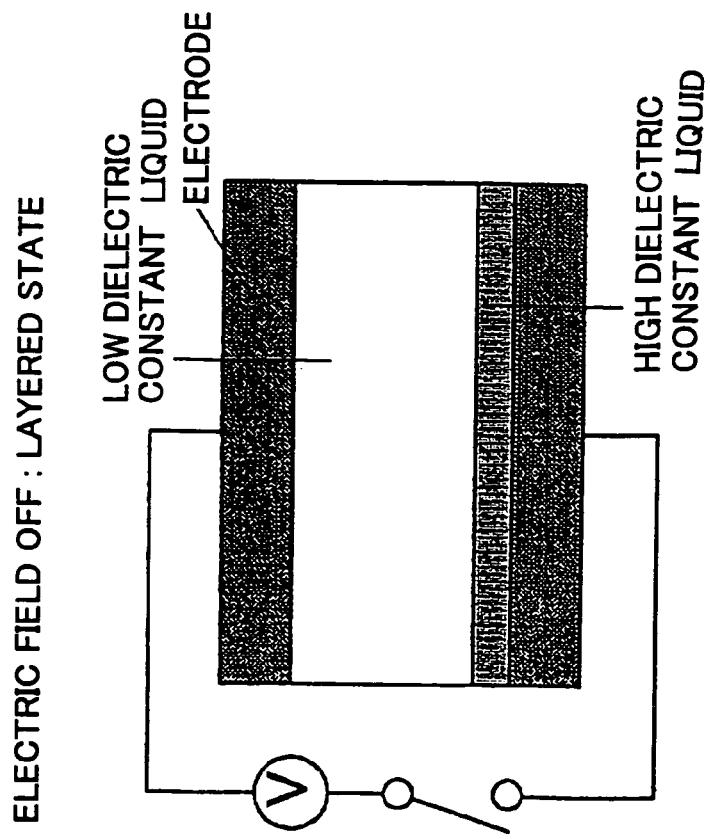

FIG. 3A and FIG. 3B schematically illustrate the ER effect when the component liquids of the compound liquid are fabricated to be layer structures.

In this method, to fabricate the layered structures of the component liquids, a layer of the component liquid having a low dielectric constant is formed on one electrode substrate, and a layer of the component liquid having a high dielectric constant is formed on the other electrode substrate. After formation of the layers, the two electrodes are bonded to each other as the liquid layers approach each other. In this way, the component liquid having a high dielectric constant is not dispersed and a film thereof is formed uniformly. With an electric field E being applied to the component liquid having a high dielectric constant, a bridge structure is formed due to the ER effect with the high dielectric constant component liquid not being dispersed in the low dielectric constant liquid.

Alternatively, droplets of the dispersed solute, which is the high dielectric constant component liquid, can be formed on one of the electrodes.

Figure 4A:
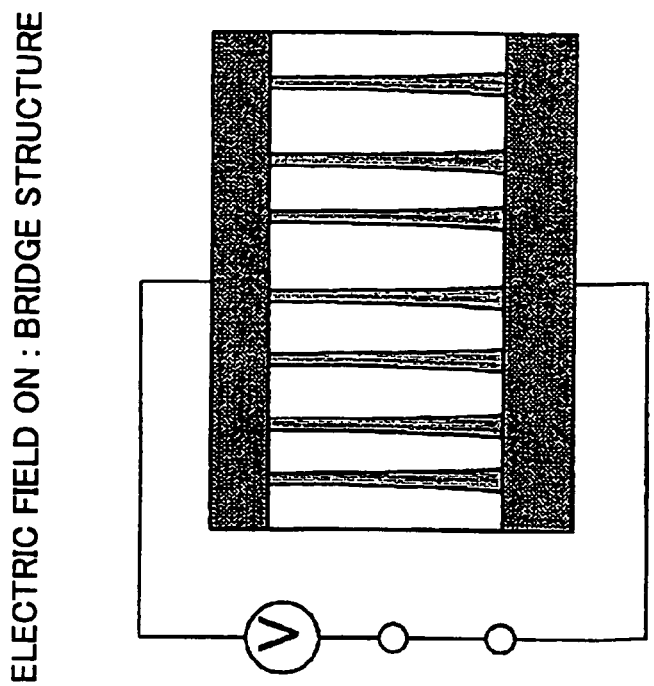
FIG. 4A and FIG. 4B schematically illustrate the ER effect when droplets of the high dielectric constant component liquid are formed on the electrode.
Figure 4B:
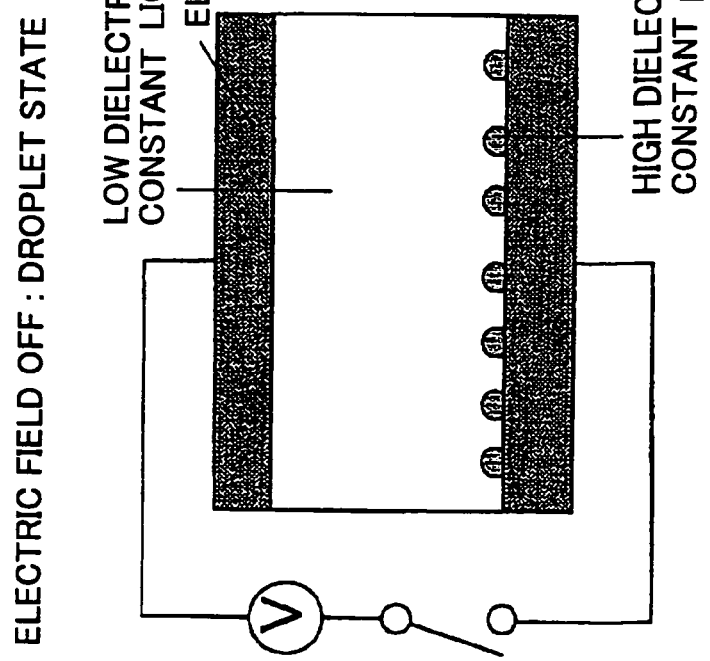

FIG. 4A and FIG. 4B schematically illustrate the ER effect when droplets of the high dielectric constant component liquid are formed on the electrode.

In this method, droplets of only the high dielectric constant component liquid are formed on the electrode. With an electric field E being applied to the high dielectric constant component liquid, the droplets stretch in the direction parallel to the electrical field due to the ER effect, forming bridge structures.

Studies of ER fluids (in the solid-liquid phase or the liquid-liquid phase), which show the ER effect, have been performed so far. In the related art, the ER effect is utilized to increase the viscosity caused by formation of the bridge structure along with application of an electrical field, or utilized in reversible variation of the viscosity, and it was considered that the ER effect is only applicable to modify properties of liquids or fluids.

In embodiments of the present invention, with a view to fabrication of a minute or small structure of a plastic molded article, and fabrication of a device of a plastic molded article having functions corresponding to the structure thereof, it is attempted to stabilize the structure of the plastic molded article, which is in the solid state, by utilizing the ER effect.

In other words, in embodiments of the present invention, among two or more component liquids of an ER solution (dispersed solution) in the liquid-liquid phase, with at least one of the component liquids being a liquid precursor of a curable resin, after an electric field is applied to the ER solution, and a bridge structure is formed due to the ER effect, a curable resin is cured to fix the bridge structure. In this way, it is possible to easily fabricate a plastic molded article having a regular pattern structure in the order of μm to nanometers.

Below, specific examples of the present embodiment are explained with reference to the accompanying drawings.

Example 1

Fluorine-Based Oil

Ultraviolet Curable Resin

In this example, an ultraviolet curable resin was added into a fluorine-based oil by an amount of 2% in weight (or in mass), and was agitated by a rotational blade type stirrer with a long axis of 17 mm at 600 rpm for six minutes.

Here, the ultraviolet curable resin acts as a dispersed solute, which is a low dielectric constant liquid or a high dielectric constant liquid in a dispersed solution. The fluorine-based oil acts as a dispersed solvent, which is the high dielectric constant liquid or the low dielectric constant liquid in the dispersed solution.

In this example, an ultraviolet curable resin manufactured by Henkel Japan Ltd. (product name: Loctite 3311) was used, and a fluorine-based oil manufactured by Daikin Industries Ltd. (product name: S-65) was used.

As a result, the ultraviolet curable resin was dispersed into droplets of about 10 μm in diameter, and a dispersed solution (a liquid mixture) was obtained.

This dispersed solution was supplied into an electric field application cell for applying an electric field.

Figure 5:
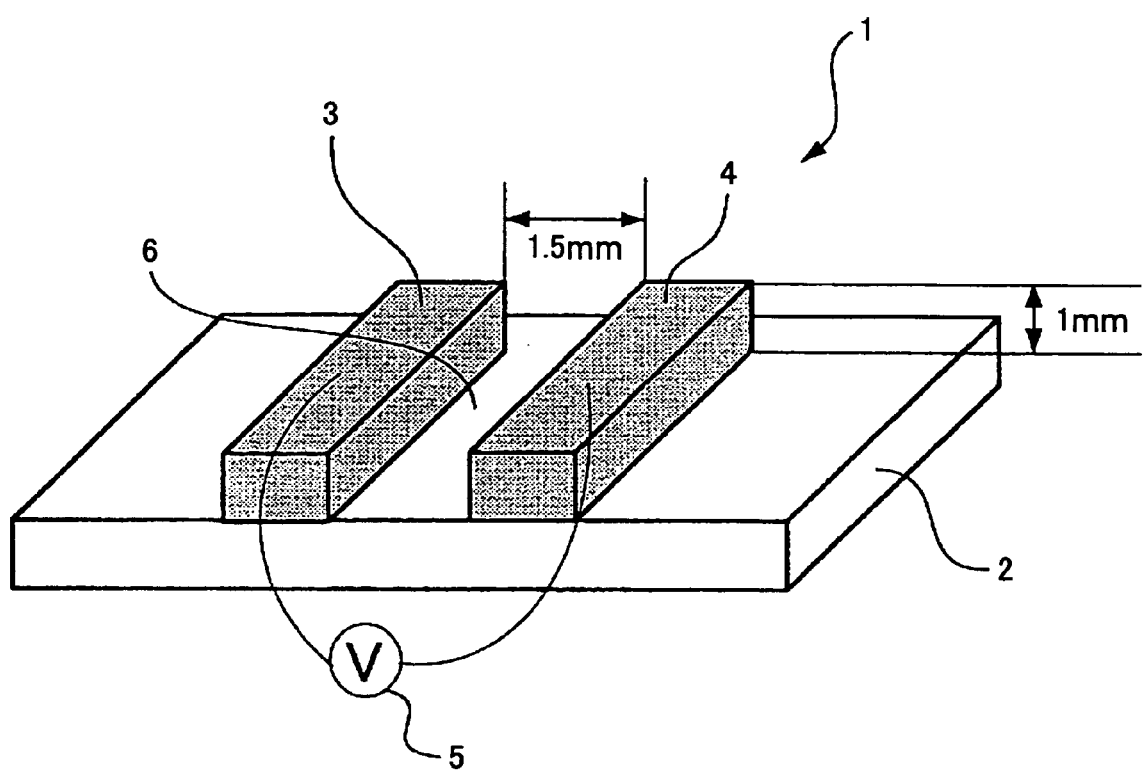
FIG. 5 is a perspective view illustrating an electric field application cell 1 according to an embodiment of the present invention.

FIG. 5 is a perspective view illustrating an electric field application cell 1 used in this example.

The electric field application cell 1 illustrated in FIG. 5 includes a glass substrate 2 and 1 mm thick rectangular columnar copper electrodes 3, 4. The copper electrodes 3, 4 were arranged on the surface of the glass substrate 2, while being separated at a distance of 1.5 mm parallel to each other. A preset voltage was applied between the copper electrodes 3, 4 by an electric power supplier 5.

FIG. 6A through FIG. 6D are views schematically illustrating a process of fabricating a plastic molded article according to the example 1.

In FIG. 6A through FIG. 6D, reference numbers 7, 8, and 9 represent the dispersed solution, dispersed solvent, and droplets, respectively, as described above.

Figure 6A:
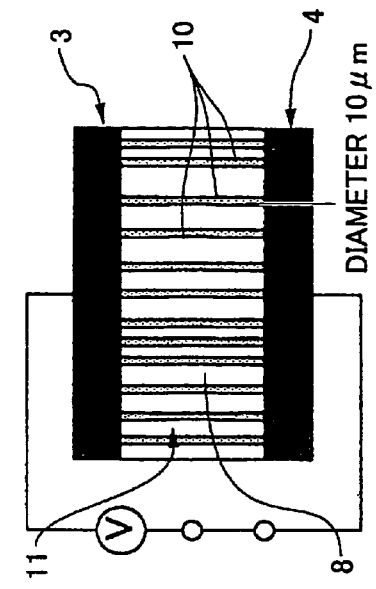
FIG. 6A through FIG. 6D are views schematically illustrating a process of fabricating a plastic molded article according to the example 1.

The dispersed solution 7 was supplied into a space 6 between the copper electrodes 3, 4, as illustrated in FIG. 6A. The dispersed solution 7 overflowing from sides of the space 6 was cast aside and removed. The dispersion state of droplets in the dispersed solution 7 was stable along time.

Figure 6B:
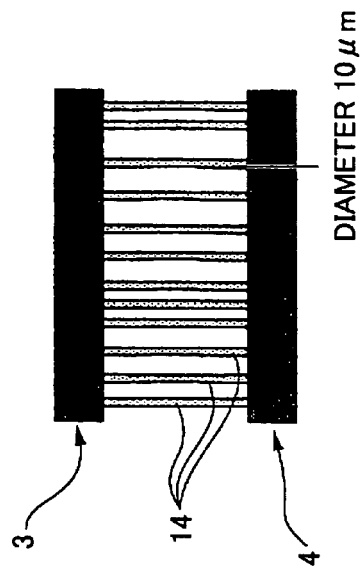

Next, as illustrated in FIG. 6B, an alternating-current electric field of 1.33 V/μm (an alternating voltage of 50 Hz and 2 kV) was applied between the copper electrodes 3, 4; due to this, the droplets 9 of the ultraviolet curable resin were deformed and stretched along the direction of the electric field, adjacent droplets 9 were tied up, the aggregation of the droplets 9 forms plural bridges 10, and the structure of the bridges 10 (represented by a reference number 11) linked the copper electrodes 3 and 4.

Figure 7:
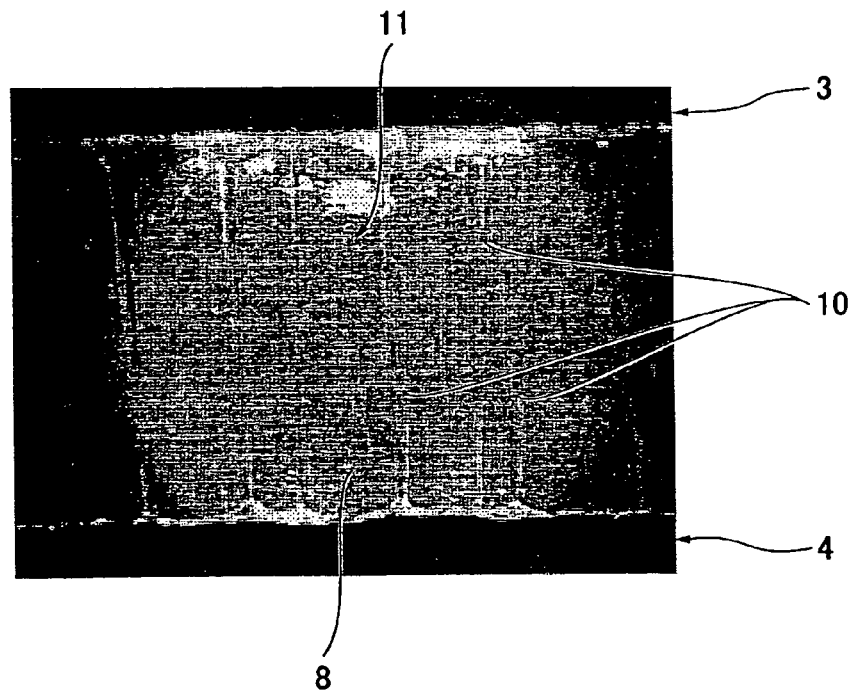
FIG. 7 is a view of the bridges 10 after the electric field is applied for 15 seconds.

FIG. 7 is a view of the bridges 10 after the electric field is applied for 15 seconds. Here, the diameter of each bridge 10 is about 10 μm.

Figure 6C:
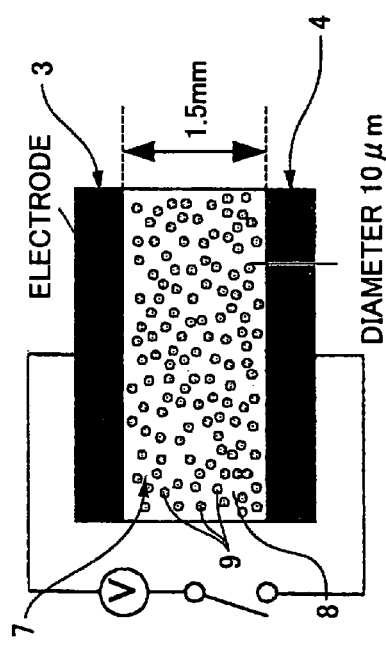

Next, as illustrated in FIG. 6C, with the electric field being applied, ultraviolet rays of 10 mW/cm$^2$ from a light source 12, for example, a mercury arc lamp, were irradiated onto the bridge structure 11 for 3 minutes. When application of the electric field was stopped, the curable resin was cured, and the bridge structure 11 was fixed.

In FIG. 6C, the bridge structure after curing of the curable resin is indicated by a reference number 13 to distinguish it from the bridge structure 11 before curing of the curable resin, and the bridges in the bridge structure 13 are indicated by a reference number 14.

Just for comparison, for the materials presently used, if application of the electric field is stopped without irradiation of the ultraviolet rays, because of the un-cured curable resin, the bridges 10 break in 10 seconds, the curable resin becomes big droplets of a few hundreds μm in diameter, and is dispersed in the dispersed solvent 8 again.

Figure 6D:
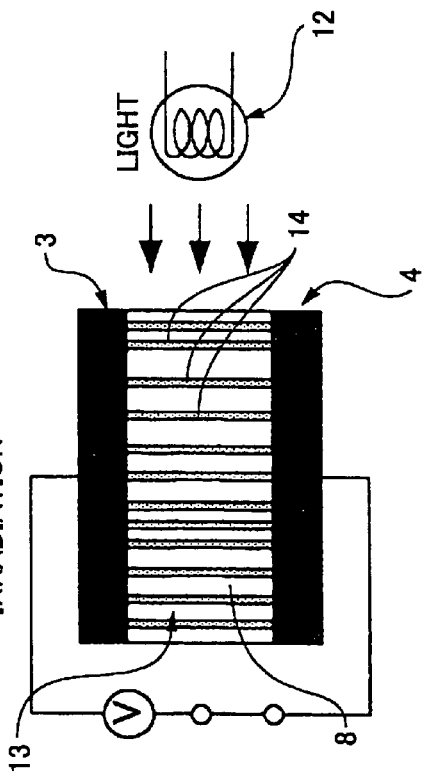

Next, as illustrated in FIG. 6D, the electric field application cell 1 with the bridge structure 13 formed therein was immersed in a fluorine-based solvent, such as fluorine-hydrocarbon, and the fluorine oil was removed. Consequently, the minute columnar objects, that is, the plural bridges 14 between the electrodes 3 and 4, are obtained as the plastic molded articles.

For comparison, if the minute columnar objects like the bridges 14 are to be fabricated by injection molding, one needs to fabricate a mold having penetration holes, fill the holes with a melted resin by injection, and separate the mold. The problem is that when the diameter of the penetration holes is in the order of mm or less, it is difficult to sufficiently fill the holes by injecting the resin from the two ends; furthermore, when fabricating an array of the molded articles, the arrival points of the injected melting resin fluctuate greatly. Hence, even if the injection is successful, it is difficult to de-mold the articles without damaging the shape after the melting resin is cured; thus, it is difficult to put into practical use.

On the other hand, in the method of fabricating a plastic molded article according to the present example, due to the Electrorheology (ER) effect, the high dielectric constant component liquid is concentrated and automatically extended along the direction of the electric field, and is fixed when the curable resin cures; hence, it is possible to fabricate a plastic molded article precisely and very easily with low cost.

Example 2

Fluorine-Based Oil

Ultraviolet Curable Resin

The processing in the present example is basically the same as that in the example 1 except that a direct-current electric field of 1.0 V/μm was applied in the present example. A plastic molded article substantially the same as that in the example 1 was obtained.

Example 3

Silicon Oil

Ultraviolet Curable Resin

In this example, a silicon oil manufactured by Sin-Etsu Chemical Co. Ltd. (product name: Sin-Etsu silicone KF-96-500CS) was used, and an alternating-current electric field of 1.0 V/μm (an alternating voltage of 50 Hz and 1.5 kV) is applied between the copper electrodes 3, 4. The other processing in the present example is the same as that in the example 1, and the bridge structure 11 shown in FIG. 8 was obtained.

Figure 8:
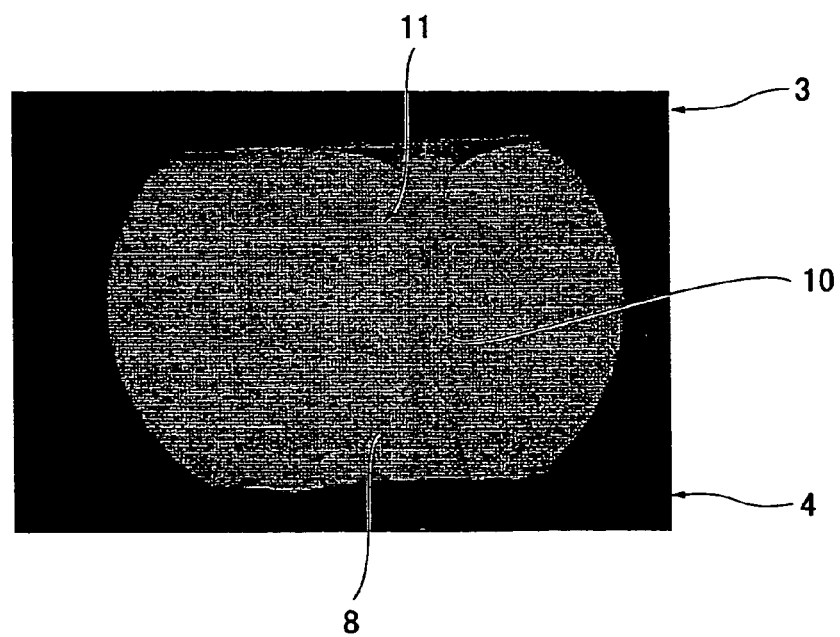
FIG. 8 is a view of the bridge structure 11 obtained in the present example.

FIG. 8 is a view of the bridge structure 11 obtained in the present example.

In this example, upon application of the electrical field, due to polarization of the droplets of the ultraviolet curable resin, these droplets aggregate caused by a Coulomb attractive force, and as a result, the diameter of each bridge 10 is about 300 μm, much greater than that in example 1.

After irradiation of ultraviolet rays onto the bridge structure 11 and curing of the curable resin, the bridge structure 11 was fixed, which includes the relatively large bridges 10 serving as the plastic molded articles. Then, the electric field application cell 1 was immersed in a silicon oil and an ethanol solution sequentially, which have similar material properties as the dispersed solvent and have low viscosity. Thereby, the silicon oil, serving as the dispersed solvent, was removed.

Example 4

Silicon Oil

Ultraviolet Curable Resin

The processing in the present example is basically the same as that in the example 3 except that a direct-current pulsed electric field of 1.0 V/μm and 1 kHz was applied in the present example. A plastic molded article substantially the same as that in the example 3 was obtained.

Example 5

Ultraviolet Curable Resin

Ultraviolet Curable Resin

In this example, an ultraviolet curable resin (product name: NOLAND NOA 60) serving as a dispersed solvent was added into a liquid crystal-group ultraviolet curable resin (manufactured by DAINIPPON Ink AND CHEMICALS, INC., product name: UCL-011) serving as a dispersed solute by an amount of 2% in weight (or in mass), and was agitated by the rotational blade type stirrer in the example 1 at 600 rpm for 10 minutes.

As a result, the liquid crystal-group ultraviolet curable resin was dispersed into droplets of about 10 μm in diameter, and a dispersed solution (a liquid mixture) was obtained. This dispersed solution was supplied into the electric field application cell 1. The dispersed solution overflowing from sides of the space 6 was cast aside and removed. The dispersion state of droplets in the dispersed solution was stable along time.

Next, the same as that shown in FIG. 6B, an alternating-current electric field of 1.5 V/μm (an alternating voltage of 50 Hz and 2.25 kV) was applied between the copper electrodes 3, 4; due to this, the droplets of the liquid crystal ultraviolet curable resin were stretched along the direction of the electric field, adjacent droplets were tied up, and the aggregation of the droplets formed a bridge structure as shown in FIG. 6B.

Next, with the electric field being applied, ultraviolet rays of 10 mW/cm² from a light source 12 were irradiated onto the bridge structure 11 for 3 minutes. When application of the electric field was stopped, the curable resins serving as the dispersed solvent and the dispersed solute were cured, and a plastic molded article 15 as shown in FIG. 9 was obtained.

Figure 9:
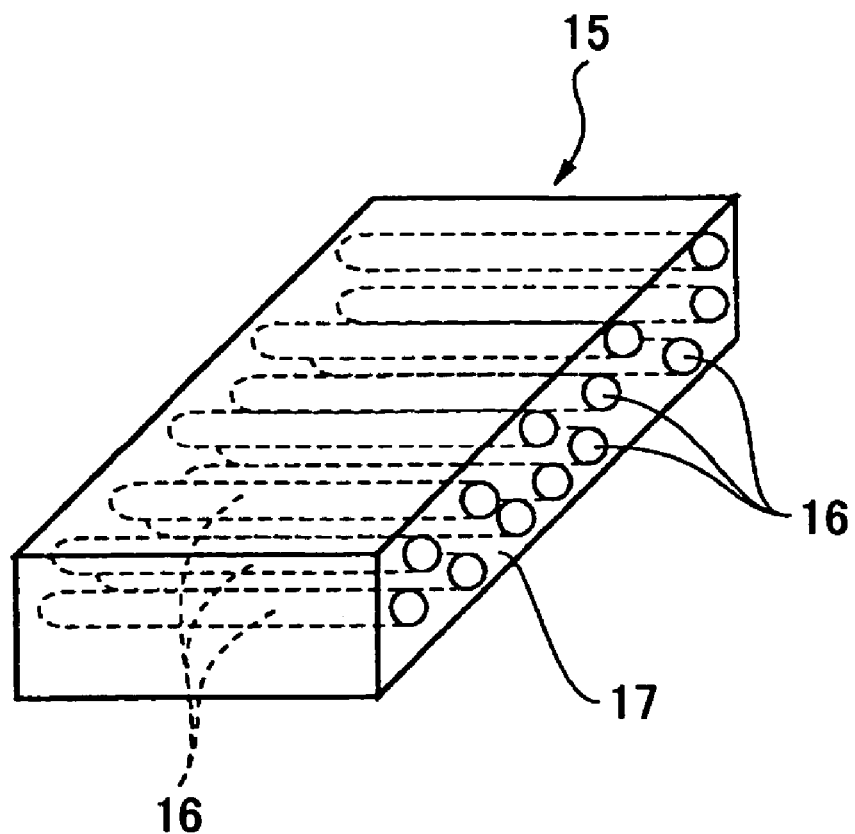
FIG. 9 is a perspective view of a plastic molded article 15 obtained in the example 5.

FIG. 9 is a perspective view of a plastic molded article 15 obtained in the example 5.

In FIG. 9, minute bridge portions 16 are formed when the dispersed solute is cured, and matrix portion 17 is formed when the dispersed solvent is cured.

For example, if the bridge portions 16 are transparent, and the matrix portion 17 is not transparent, the plastic molded article 15 can be used a light guide part.

When the central curing wavelength of the ultraviolet rays for curing the ultraviolet curable resin as the dispersed solvent is different from the central curing wavelength of the ultraviolet rays for curing the ultraviolet curable resin as the dispersed solute, a light source emitting light including both of the above two wavelengths can be used in curing the two ultraviolet curable resins at the same time; alternatively, two light sources emitting light of different wavelengths may be used to irradiate the sample separately so as to cure the dispersed solvent and the dispersed solute separately.

Example 6

Thermo-Melt Resin

Ultraviolet Curable Resin

In this example, a melted material to be used as a dispersed solvent was prepared by crushing polypropylene pellets (manufactured by Idemitsu Kosan Co., product name: IDEMITSU PP J-2021GR) into powder by using a powdering machine, and heating and melting the powder at 170° C. While being agitated, this melted material was added into an ultraviolet curable resin (manufactured by DAINIPPON Ink AND CHEMICALS, INC., product name: UCL-011) serving as a dispersed solute by an amount of 2% in weight (or in mass), and was agitated successively until the ultraviolet curable resin was dispersed into droplets of about 10 μm in diameter. Thus, a dispersed solution (a liquid mixture) was obtained in which droplets of the ultraviolet curable resin were dispersed in the melt resin. In this dispersed solution, the same as the dispersed solutions in the previous examples, the dispersion state of droplets in the dispersed solution was stable along time even after agitation was stopped.

Next, the electric field application cell 1 was arranged on a hot plate and was heated to 170° C., and the prepared dispersed solution was supplied into the space 6 between the copper electrodes 3 and 4 in the electric field application cell 1.

Next, a direct-current electric field of 1.0 V/μm was applied between the copper electrodes 3, 4; due to this, the droplets of the ultraviolet curable resin were stretched along the direction of the electric field, and adjacent droplets were tied up. Thus, a bridge structure as shown in FIG. 6B was obtained.

Next, with the electric field being applied, ultraviolet rays of 100 mW/cm² from a light source 12 were irradiated onto the bridge structure 11 for 3 minutes. When application of the electric field was stopped, the ultraviolet curable resin was cured, and the bridge structure was fixed.

In addition, when the hot plate stopped heating the electric field application cell 1, the melted acrylic resin cooled and cured; thus, a plastic molded article as shown in FIG. 9 was obtained, which has a bridge portion and a matrix portion.

In this example, hindrance to curing of the ultraviolet curable resin due to absorption of ultraviolet rays in the acrylic resin was not observed.

In this example, the acrylic resin may be cooled and cured first before the ultraviolet curable resin was cured by irradiation of ultraviolet rays.

Example 7

Silicon Oil

Thermo-Curable Resin

In the present example, a thermo-curable resin (product name: NOLAND NOA 83H) was used a dispersed solvent, and by the operations of electric field application the same as that in the example 3, a bridge structure as shown in FIG. 6B was obtained.

Next, with the electric field being applied, the electric field application cell 1 was heated for 10 minutes to 130° C. When application of the electric field was stopped, the thermo-curable resin was cured and a bridge structure was maintained, resulting in a plastic molded article as shown in FIG. 6D.

After the thermo-curable resin was cured, the electric field application cell 1 was immersed in a silicon oil and an ethanol solution sequentially, which have similar material properties as the dispersed solvent and have low viscosity; thereby, the silicon oil serving as the dispersed solvent was removed.

Example 8

Ultraviolet Curable Resin

Thermo-Curable Resin

In the present example, a thermo-curable resin (product name: NOLAND NOA 83H) was used a dispersed solvent, and an ultraviolet curable resin (manufactured by DAINIPPON Ink AND CHEMICALS, INC., product name: UCL-011) was used as a dispersed solute. By the operations of electric field application the same as that in the example 7, a bridge structure as shown in FIG. 6B was obtained.

Next, with the electric field being applied, the electric field application cell 1 was heated for 10 minutes to 130° C. When application of the electric field was stopped, the thermo-curable resin was cured and a bridge structure was maintained, resulting in a plastic molded article as shown in FIG. 6D.

Further, the ultraviolet curable resin was cured by irradiating ultraviolet rays and a plastic molded article as shown in FIG. 9 was obtained, which has a bridge portion and a matrix portion.

In this example, the ultraviolet curable resin may be cured first by irradiating ultraviolet rays before the thermo-curable resin was cured by heating.

Example 9

Modification of Electric Field Application Cell

Figure 10A:
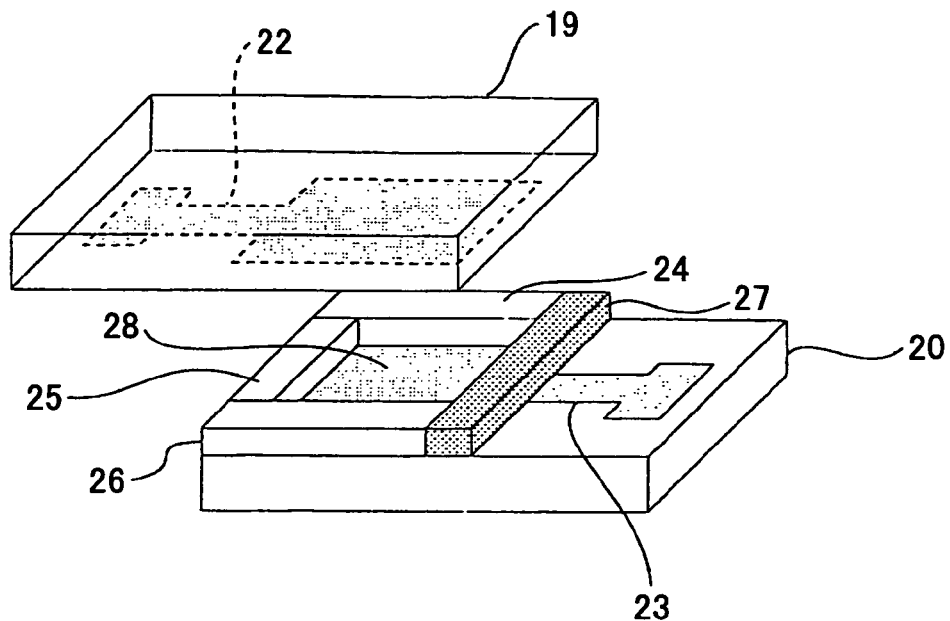
FIG. 10A and FIG. 10B are perspective views illustrating an electric field application cell 18.
Figure 10B:
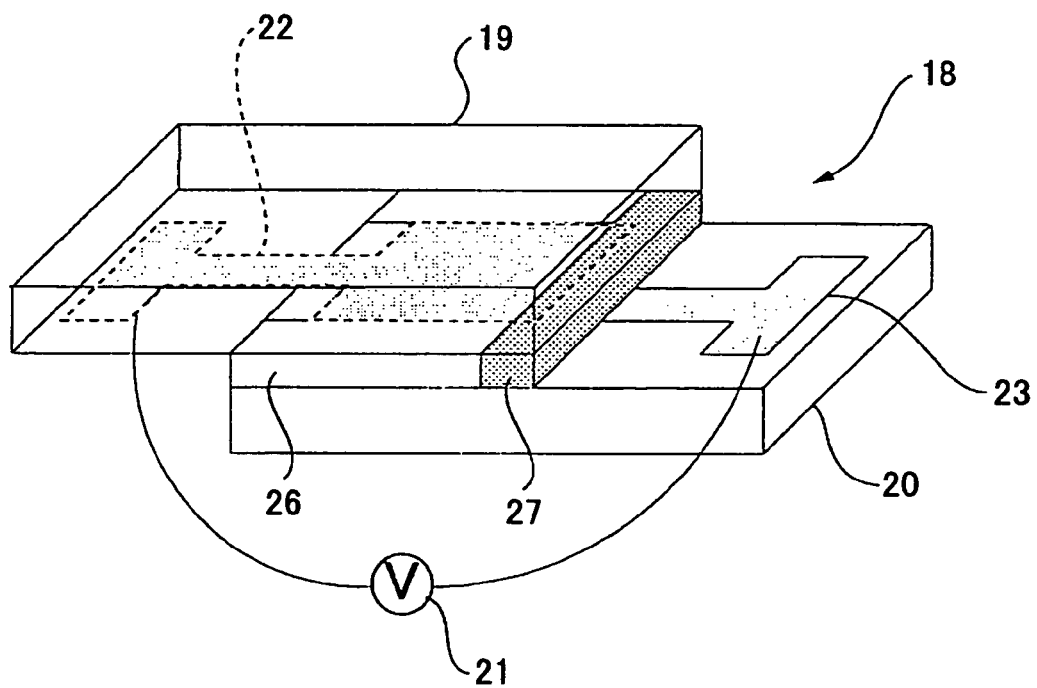

In this example, the dispersed solution as described in example 1 was supplied into an electric field application cell 18 as shown in FIG. 10A and FIG. 10B.

FIG. 10A and FIG. 10B are perspective views illustrating an electric field application cell 18.

The electric field application cell 18 includes glass substrates 19 and 20 facing each other, and a power supplier 21.

An electrode 22 having a specified pattern is formed by evaporation of ITO (Indium Tin Oxide) on the bottom of the glass substrate 19, and an electrode 23 having a specified pattern is formed by evaporation of ITO (Indium Tin Oxide) on the top of the glass substrate 20. Rectangular columnar glass spacers 24, 25, 26 and an insulating spacer 27 are arranged on the electrode 23 to form a square, as illustrated in FIG. 10A, with the insulating spacer 27 being in close contact with the glass spacers 24, 26. Hence, a square electrical field chamber 28 is formed to be enclosed by the glass spacers 24, 25, 26, and the insulating spacer 27.

The glass spacers 24, 25, 26 are fixed on the glass substrate 20 with a white wax, which is an adhesive agent melted by heat. The insulating spacer 27 is arranged on the glass substrate 20 detachably. The height of each of the glass spacers 24, 25, 26, and the insulating spacer 27 is 1.0 mm.

In FIG. 10A, it is illustrated that the ITO (Indium Tin Oxide) is evaporated in portions of the bottom and top of the glass substrates 19, 20, respectively, alternatively, the ITO (Indium Tin Oxide) may also be evaporated on all of the bottom and top of the glass substrates 19, 20, respectively.

The dispersed solution is supplied into the chamber 28 on the glass substrate 20, and the glass substrate 19 is arranged on the glass spacers 24, 25, 26, and the insulating spacer 27 so as to cover the dispersed solution in the chamber 28. The dispersed solution overflowing from sides of the chamber 28 was cast aside and removed.

Because of the glass spacers 24, 25, 26, and the insulating spacer 27, the distance between the glass substrates 19, 20, in turn, the electrodes 22 and 23, is maintained to be a preset value. In this example, this distance is 1.0 mm.

Next, an alternating-current electric field of 1 V/µm (an alternating voltage of 50 Hz and 1 kV) was applied between the electrodes 22, 23 by the power supplier 21, and due to this, droplets of the ultraviolet curable resin were deformed and stretched along the direction of the electric field, and adjacent droplets 9 were tied up, forming a bridge structure including plural bridges between the electrodes 22, 23. Here, the diameter of each bridge is about 10 µm.

Next, with the electric field being applied, ultraviolet rays are irradiated onto the inside of the chamber 28, through the electrodes 22, 23 or the glass spacers 24, 25, 26. Then, when application of the electric field is stopped, the curable resin is cured, and the bridge structure is fixed.

The ends of the bridges appeared as dots when viewed through the glass substrates 19, 20 and the electrodes 22 and 23. It was observed that when application of the electric field was stopped, the dot pattern of the bridges did not change at all.

Then, the insulating spacer 27 was removed, and an ethanol solution, which does not dissolve the ultraviolet curable resin, was used to wash off oil adhering to the cured bridges; columns randomly arranged on the surface, on which the electrical field was applied, were obtained as the plastic molded articles.

Example 10

Fabrication of Plastic Molded Article Having Openings

In this example, glycerine (manufactured by KANTOU KAGAKU, reagent), which has a high dielectric constant, was added into an ultraviolet curable resin (product name: NOLAND NOA 60), which has a low dielectric constant, and was agitated until the oil was dispersed into droplets of about 10 µm in diameter; hence, a dispersed solution (a liquid mixture) was prepared.

Figure 11:
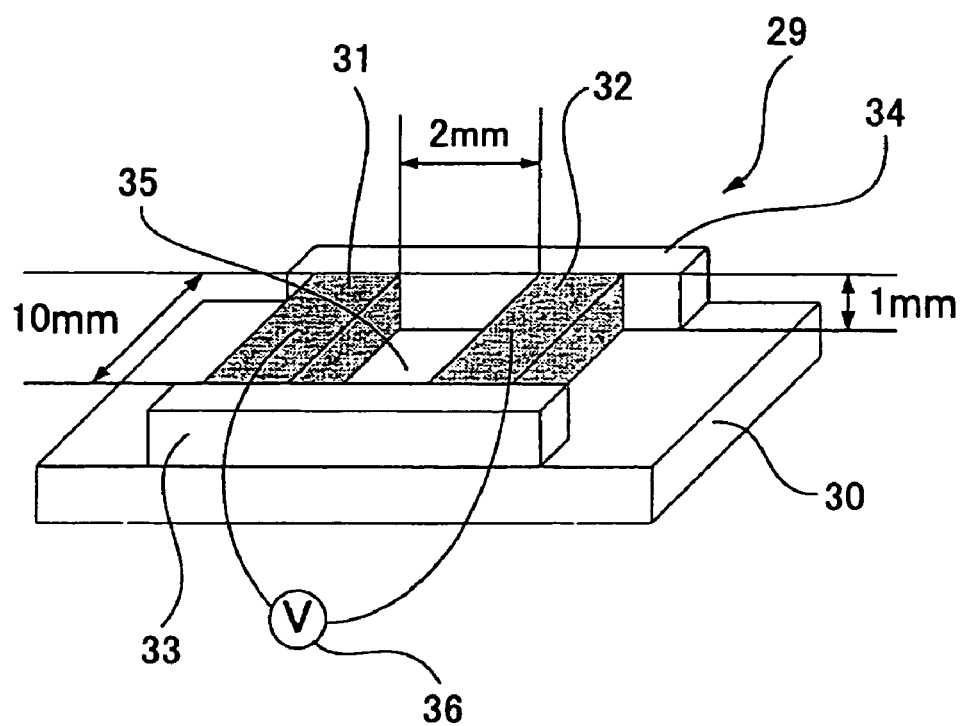
FIG. 11 is a perspective view illustrating an electric field application cell 29.

This dispersed solution was supplied into an electric field application cell 29 as shown in FIG. 11.

FIG. 11 is a perspective view illustrating an electric field application cell 29.

The electric field application cell 29 includes a glass substrate 30 and rectangular columnar copper electrodes 31, 32, each of which is 1 mm thick and 10 mm long. The copper electrodes 31, 32 are arranged on the surface of the glass substrate 30, while being separated at a distance of 2.0 mm parallel to each other. Insulating spacers 33, 34 are arranged on the glass substrate 30 to be perpendicular to the copper electrodes 31, 32 and in close contact with ends of the copper electrodes 31, 32. Hence, a square electrical field chamber 35 is formed on the glass substrate 30 to be enclosed by the copper electrodes 31, 32 and the insulating spacers 33, 34.

A preset voltage was applied between the copper electrodes 31, 32 by an electric power supplier 36.

The chamber 35 was filled with the prepared dispersed solution, and an alternating-current electric field of 1.5 V/μm (an alternating voltage of 50 Hz and 3 kV) was applied on the chamber 35, that is, between the copper electrodes 31, 32 by the power supplier 36; due to this, droplets of the glycerine solution were deformed and stretched along the direction of the electric field and adjacent droplets were tied up, forming a bridge structure as illustrated in FIG. 6B.

Figure 12A:
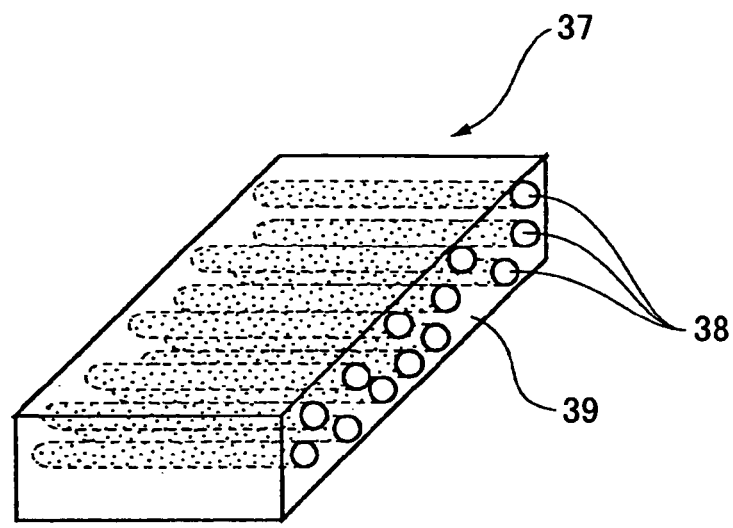
FIG. 12A and FIG. 12B are perspective views of the bridge structure 37 obtained in the example 10.
Figure 12B:
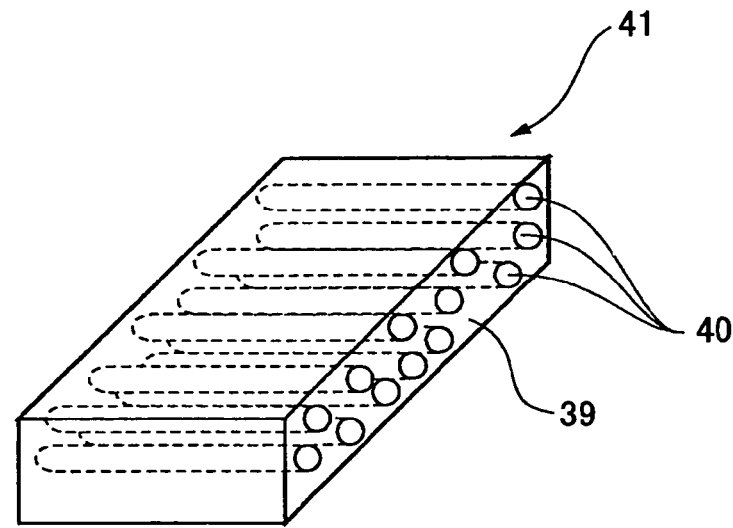

Next, with the electric field being applied, ultraviolet rays were irradiated onto the inside of the chamber 35, then, when application of the electric field was stopped, the curable resin was cured and a bridge structure 37 as shown in FIG. 12A and FIG. 12B was obtained.

FIG. 12A and FIG. 12B are perspective views of the bridge structure 37 obtained in the example 10.

In FIG. 12A, bridge portions 38 are formed from the oil, a matrix portion 39 is formed the ultraviolet curable resin, and when the matrix portion 39 is cured, the liquid oil forming bridge portions 38 is supported to be in columnar shapes.

Then, the bridge structure 37 was cut out in units of the glass substrate 30 by a not-illustrated dicing saw, and the thus obtained bridge structure 37 together with the glass substrate 30 were cleaned in an ethanol solution by using ultrasonic wave; thereby, the glycerine solution was dissolved and removed, and a plastic molded article 41 having holes 40, like a honeycomb, was obtained, as shown in FIG. 12B. The plastic molded article 41 has minute holes 40 extending in a single direction. In the related art, it is very difficult to fabricate such an article.

Example 11

Bonding Electrodes Each Having Liquid Films

In this example, films of two component liquids of a compound liquid, one having a low dielectric constant and the other one having a high dielectric constant, are formed on two electrodes, respectively.

FIG. 13A through FIG. 13C are views schematically illustrating a process of fabricating a plastic molded article according to the example 11, in which a layered structure of a compound liquid is built in an electric field application cell.

In FIG. 13A through FIG. 13C, electrodes 42, 44 are fabricated by arranging films formed from conductive materials such as Al, Ni, Cu, ITO, on respective electrode substrates.

As illustrated in FIG. 13A, a film 43 of a high dielectric constant liquid, specifically, an ultraviolet curable resin manufactured by Henkel Japan Ltd. (product name: Loctite 3311), was formed on the electrode 42, and a film 45 of a low dielectric constant liquid, specifically, a silicon oil manufactured by Sin-Etsu Chemical Co. Ltd. (product name: Sin-Etsu silicone KF-65-1000CS) was formed on the electrode 44.

As illustrated in FIG. 13A, the two electrodes 42, 44, with the high dielectric constant liquid film 43 and the low dielectric constant liquid film 45 formed thereon, respectively, were bonded with each other such that the liquid layers 43 and 45 were brought to be close to each other. In this way, a compound liquid having a layered structure was built between the electrodes 42 and 44, and an electric field application cell was formed, as illustrated in FIG. 13B.

Next, as illustrated in FIG. 13C, by a power supply 46, a direct-current electric field of 1.0 V/μm was applied between the electrodes 42, 44, that is, to the compound liquid having a layered structure, and due to the electric field, specific portions of the high dielectric constant liquid 43 were extended along the direction of the electric field. Thus a bridge structure 48 including plural bridges 47 linking the electrodes 42 and 44 was obtained.

Figure 14A:
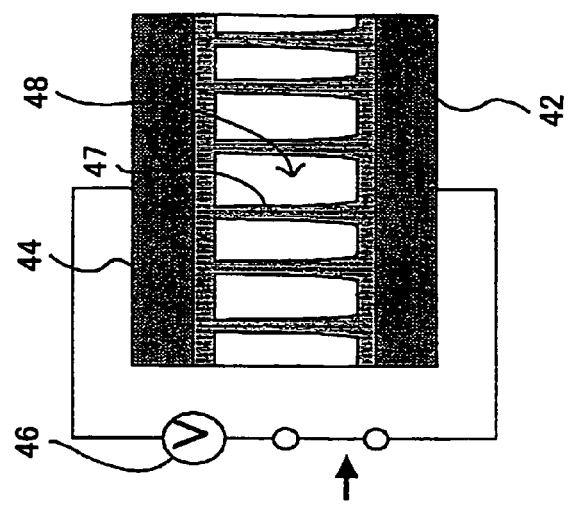
FIG. 14A through FIG. 14C are views schematically illustrating another process of fabricating a plastic molded article according to the example 11, in which a layered structure of a compound liquid is built in an electric field application cell.
Figure 14B:
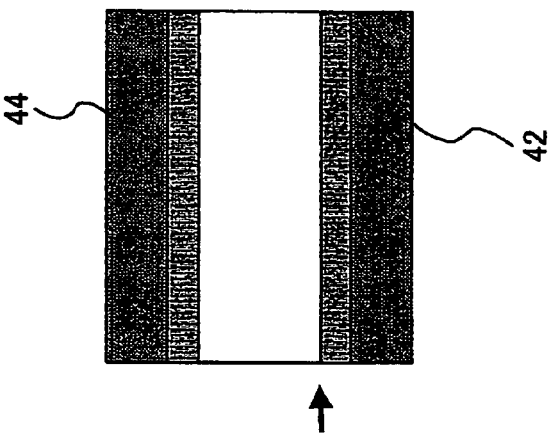
Figure 14C:
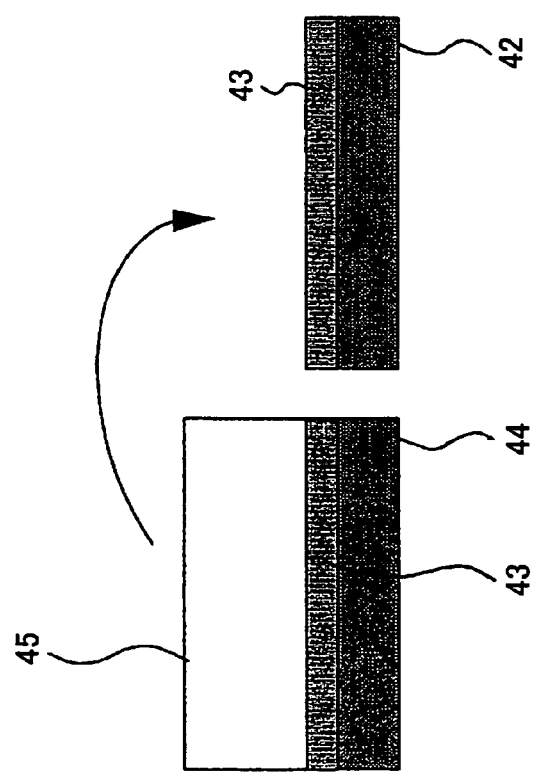

FIG. 14A through FIG. 14C are views schematically illustrating another process of fabricating a plastic molded article according to the example 11, in which a layered structure of a compound liquid is built in an electric field application cell.

In FIG. 14A, first, two high dielectric constant liquid films 43 were formed on both the electrodes 42 and 44, and a low dielectric constant liquid film 45 was further formed on the electrode 44. Then, the electrode 42 with the high dielectric constant liquid film 43 formed thereon and the electrode 44 with the high dielectric constant liquid film 43 and the low dielectric constant liquid film 45 formed thereon, were bonded with each other such that the liquid layer 43 on the electrode 42 and the liquid layer 45 on the electrode 44 were brought to be close to each other, as illustrated in FIG. 14B.

In this example, because the component liquids were formed to be layers on the two electrodes 42 and 44, respectively, the high dielectric constant component liquid was not dispersed into droplets in the liquid mixture.

Example 12

Bonding Electrode Having Liquid Films with Another Electrode

In this example, films of two component liquids of a compound liquid, one having a low dielectric constant and the other one having a high dielectric constant, are formed on one electrode sequentially.

FIG. 15A through FIG. 15D are views schematically illustrating a process of fabricating a plastic molded article according to the example 12, in which two liquid films are formed on one electrode sequentially.

In FIG. 15A through FIG. 15D, electrodes 42, 44 are fabricated by arranging films formed from conductive materials such as Al, Ni, Cu, ITO, on respective electrode substrates.

As illustrated in FIG. 15A, first, a film 43 of a high dielectric constant liquid, specifically, an ultraviolet curable resin manufactured by Henkel Japan Ltd. (product name: Loctite 3311), was formed on the electrode 42.

Then, as illustrated in FIG. 15B, a film 45 of a low dielectric constant liquid, specifically, a silicon oil manufactured by Sin-Etsu Chemical Co. Ltd. (product name: Sin-Etsu silicone KF-65-1000CS) was formed on the film 43.

In addition, the electrode 44 was arranged on the low dielectric constant liquid film 45; thereby, a compound liquid having a layered structure was built between the electrodes 42 and 44, and an electric field application cell was formed, as illustrated in FIG. 15C.

Next, as illustrated in FIG. 15D, by the power supply 46, a direct-current electric field of 1.0 V/μm was applied between the electrodes 42, 44, that is, to the compound liquid having a layered structure, and the same as in the example 11, specific portions of the high dielectric constant liquid 43 were extended along the direction of the electric field. Thus, a bridge structure 48 including plural bridges 47 linking the electrodes 42 and 44 was obtained.

FIG. 16A through FIG. 16D are views schematically illustrating another process of fabricating a plastic molded article according to the example 12, in which two liquid films are formed on one electrode sequentially.

As illustrated in FIG. 16A, first, a high dielectric constant liquid film 43 was formed on the electrode 42. Then, as illustrated in FIG. 16B, a low dielectric constant liquid film 45 was formed on the film 43. Further, another high dielectric constant liquid film 43 was formed on the low dielectric constant liquid film 45. Then, the electrode 44 was arranged on the second high dielectric constant liquid film 43.

Example 13

Forming Droplets on Electrode

In this example, a high dielectric constant liquid of two component liquids forming a compound liquid is arranged on one electrode in form of droplets, and a film of a low dielectric constant liquid is formed on another electrode.

FIG. 17A through FIG. 17D are views schematically illustrating a process of fabricating a plastic molded article according to the example 13, in which a high dielectric constant liquid is in the form of droplets on one electrode, and a low dielectric constant liquid is in the form of a thin film on another electrode.

In FIG. 17A through FIG. 17D, electrodes 49, 53 are fabricated by arranging films formed from conductive materials such as Al, Ni, Cu, ITO, on respective electrode substrates.

As illustrated in FIG. 17A, droplets 50 of a high dielectric constant liquid, specifically, an ultraviolet curable resin manufactured by Henkel Japan Ltd. (product name: Loctite 3311), were injected from an injection machine 51, manufactured by Musashi Engineering (product name: SMP-III), on the electrode 49. The diameter of the droplets 50 is about 50 μm.

A head of an inkjet printer may also be used instead of the injection machine 51.

A film 52 of a low dielectric constant liquid was formed on the electrode 49, on which the droplets 50 of the high dielectric constant liquid were formed. Further, the electrode 53 was arranged on the low dielectric constant liquid film 52.

In this way, a compound liquid was supplied between the electrodes 49 and 53, and an electric field application cell was formed, as illustrated in FIG. 17C.

Next, as illustrated in FIG. 17D, by a power supply 54, a direct-current electric field of 1.0 V/μm was applied between the electrodes 49, 53, that is, on the compound liquid. Due to the electric field, the droplets 50 of the high dielectric constant liquid were extended along the direction of the electric field; thus, a bridge structure 56 including plural bridges 55 linking the electrodes 49 and 53 was obtained.

In this example, as the droplets 50 of the high dielectric constant liquid were formed on the electrode 49 without other liquids in between, there is no droplet which is dispersed from the high dielectric constant liquid in the liquid mixture and escapes from the surface of the electrode. In addition, the bridges 55 are formed at the positions of the droplets 50, so it is possible to make the bridge structure 56 into a desired pattern.

Figure 18A:
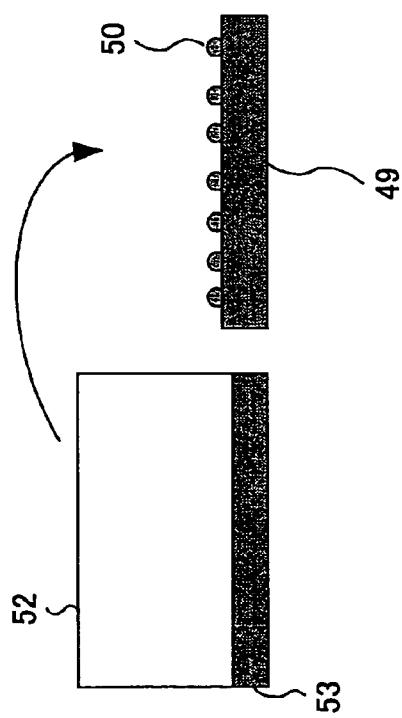
FIG. 18A through FIG. 18C are views schematically illustrating other processes of fabricating a plastic molded article according to example 13, in which a high dielectric constant liquid is in the form of droplets on one electrode, and a low dielectric constant liquid is in the form of a thin film on another electrode.
Figure 18B:
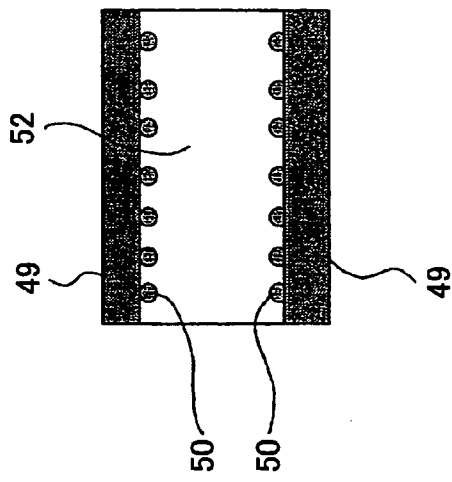
Figure 18C:
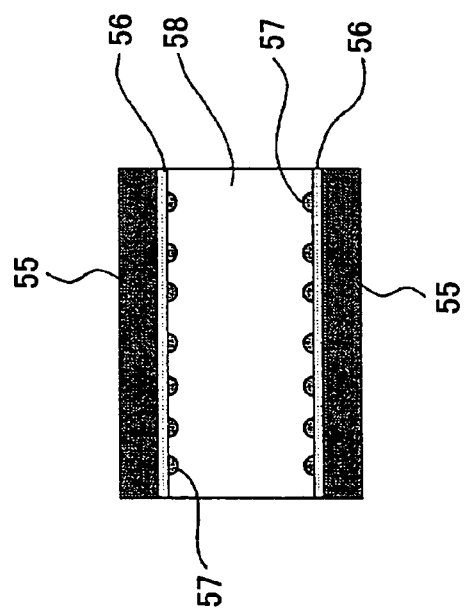

FIG. 18A through FIG. 18C are views schematically illustrating other processes of fabricating a plastic molded article according to example 13, in which a high dielectric constant liquid is in the form of droplets on one electrode, and a low dielectric constant liquid is in the form of a thin film on another electrode.

In FIG. 18A, the droplets 50 of the high dielectric constant liquid were formed on the electrode 49, and the low dielectric constant liquid film 52 was formed on the electrode 53, then the electrodes 49, 53 were bonded with each other, thereby supplying a compound liquid between the electrodes 49 and 53.

In FIG. 18B, the droplets 50 of the high dielectric constant liquid were formed on two electrodes 49, and the low dielectric constant liquid film 52 was formed between the two electrodes 49.

In FIG. 18C, droplets 57 of the high dielectric constant liquid were not directly formed on electrodes 55, but an intermediate layer 56, for example, plastic sheets, are arranged on the electrodes 55, and then the droplets 57 of the high dielectric constant liquid were formed on the intermediate layer 56. A low dielectric constant liquid film 58 was formed between the electrodes 55. Here, the intermediate layer 56 and the electrodes 55 may be in close contact with each other, or just in loose contact.

Example 14

Forming Droplets on Electrode by Surface Treatment

In this example, droplets of the high dielectric constant component liquid are obtained by using a surface treatment agent which has a property of repelling the high dielectric constant component liquid.

FIG. 19A through FIG. 19D are views schematically illustrating steps of fabricating a plastic molded article according to the example 13 by using a surface treatment agent which has a property of repelling the high dielectric constant component liquid.

Figure 19A:
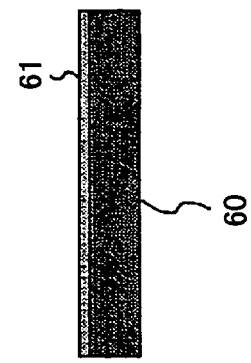
FIG. 19A through FIG. 19D are views schematically illustrating steps of fabricating a plastic molded article according to the example 13 by using a surface treatment agent which has a property of repelling the high dielectric constant component liquid.
Figure 19B:
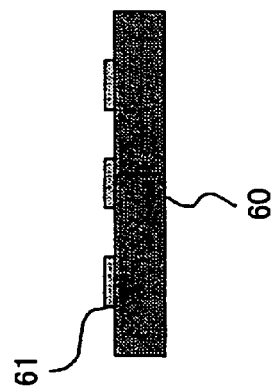
Figure 19C:
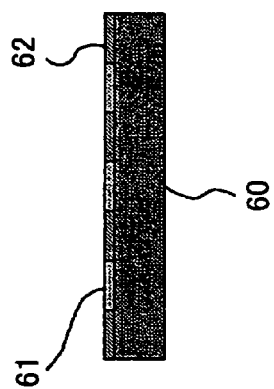
Figure 19D:
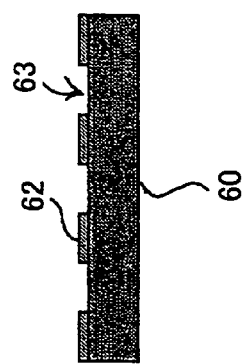
Figure 21A:
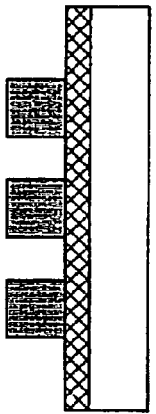
FIG. 21A through FIG. 21C are cross-sectional views schematically illustrating a method of fabricating a plastic molded article by photolithography.
Figure 21B:
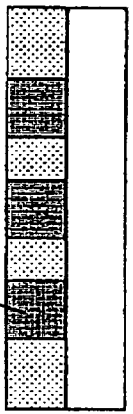
Figure 21C:
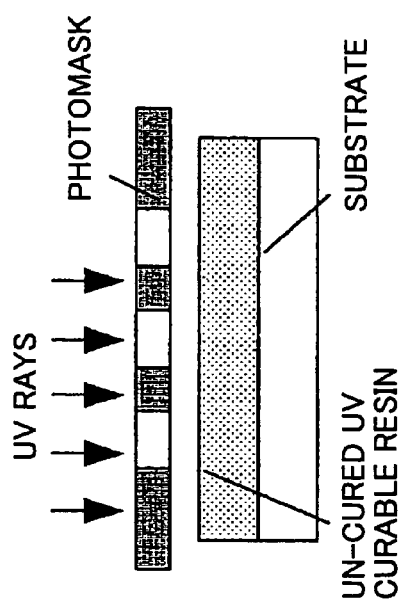
Figure 23D:
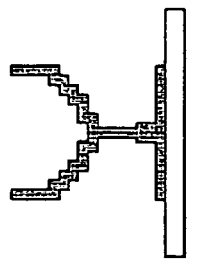
FIG. 23A through FIG. 23D are cross-sectional views schematically illustrating a method of fabricating a plastic molded article by a Rapid Prototyping process.
Figure 23C:
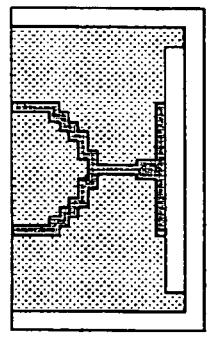
Figure 23B:
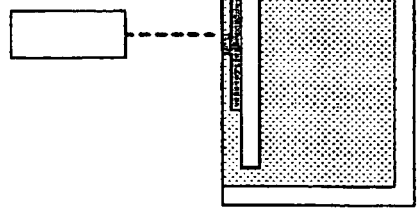
Figure 23A:
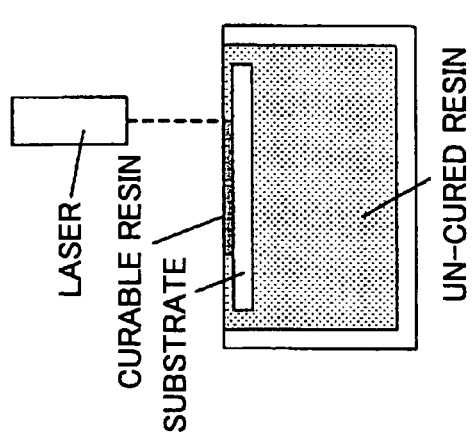

FIG. 20A through FIG. 20F, continued from FIG. 19D, are views schematically illustrating steps of fabricating a plastic molded article according to the example 13.

In FIG. 19A through FIG. 19D, and in FIG. 20A through FIG. 20F, an electrode 60 was fabricated by arranging films formed from conductive materials such as Al, Ni, Cu, ITO, on an electrode substrate.

In FIG. 19A, a photo resist 61 (manufactured by Tokyo Ohka Kogyo Co. Ltd., product name: TSMR-8900) was applied on the electrode 60 by spin-coat.

In FIG. 19B, the photo resist 61 was patterned by photolithography into square patterns, each side thereof being about 50 am long.

In FIG. 19C, a film of a surface treatment agent 62 (for example, a de-molding agent, Gelest Aquaphobe CF) was formed on the square patterns of the photo resist 61.

In FIG. 19D, the residual photo resist 61 was removed by using Acetone, and a pattern of square openings 63 were formed in the surface treatment agent 62.

Then, as illustrated in FIG. 20A, droplets 64 of a high dielectric constant liquid, specifically, an ultraviolet curable resin manufactured by Henkel Japan Ltd. (product name: Loctite 3311), were injected from an injection machine 65 into the openings 63 in the surface treatment agent 62.

As illustrated in FIG. 20C, the droplets 64 of the high dielectric constant liquid were localized in the openings 63 in the surface treatment agent 62.

Alternatively, as illustrated in FIG. 20B, a film of the high dielectric constant liquid may be formed on the electrode 60 with the square openings 63 thereon. Then, similarly, as illustrated in FIG. 20C, the high dielectric constant liquid film was localized in the openings 63 in the surface treatment agent 62, forming the droplets 64.

The diameter of the droplets 64 was about 100 μm.

After the droplets 64 were formed, the methods described in example 13 may be executed.

In FIG. 20D, a high dielectric constant liquid film 67 and a low dielectric constant liquid film 65 were formed between the electrode 60 with the droplets 64 formed thereon and the electrode 66.

In FIG. 20E, a low dielectric constant liquid film 65 was formed between the electrode 60 with the droplets 64 formed thereon and the electrode 66.

In FIG. 20F, there were two electrodes 60 each having the droplets 64 thereon, and the low dielectric constant liquid film 65 was formed between the two electrodes 60.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, in the above, it is assumed that the compound liquid includes two component liquids. Of course, the compound liquid may also include three component liquids.

In addition, the component liquids may be a combination of two thermo-curable resins, or a combination of a thermo-curable resins and a UV-curable resin.

In addition, instead of ultraviolet rays, an electron beam may also be used. When using the electron beam, an electron-beam-curable resin may be used.

This patent application is based on Japanese Priority Patent Applications No. 2004-147264 filed on May 18, 2004, the entire contents of which are hereby incorporated by reference.

What is claimed is:

1. A method of fabricating a plastic molded article, comprising:
    filling an electric field application cell with a compound liquid, said electric field application cell having electrodes facing each other, said compound liquid including at least two component liquids being insoluble in each other and having dielectric constants different from each other, at least one of the component liquids being an un-cured curable resin liquid;
    applying an electric field between the electrodes to concentrate and extend one of the component liquids in the compound liquid along a direction of the electric field so as to form a bridge structure linking the electrodes, said extended component liquid being a high dielectric constant component liquid that has a dielectric constant higher than a dielectric constant of each of the other component liquids; and
    curing the at least one component liquid that is an un-cured curable resin liquid after the bridge structure is formed to create a plastic molded article,
    wherein the component liquids are supplied in the electric field application cell without being dispersed.

2. The method as claimed in claim 1, wherein the component liquids are stacked to be a layered structure.

3. The method as claimed in claim 1, wherein the high dielectric constant component liquid is formed on at least one surface of the electrodes in the form of droplets.

4. The method as claimed in claim 2, wherein
the step of filling the electric field application cell with the compound liquid having the layered structure includes the steps of:
    forming a layer of one of the component liquids on a first electrode of the electric field application cell;
    forming a layer of another one of the component liquids on a second electrode of the electric field application cell; and
    bonding the first electrode with the one component liquid layer formed thereon and the second electrode with the other one component liquid layer formed thereon.

5. The method as claimed in claim 2, wherein
the step of filling the electric field application cell with the compound liquid having the layered structure includes the steps of:
    forming a layer of one of the component liquids on a first electrode of the electric field application cell;
    forming a layer of another one of the component liquids on the layer of the one component liquid; and
    bonding a second electrode of the electric field application cell on the layer of the other one component liquid.

6. The method as claimed in claim 3, wherein the high dielectric constant component liquid is injected onto the surface of one of the electrodes to form the droplets.

7. The method as claimed in claim 3, wherein the droplets of the high dielectric constant component liquid on the surface of one of the electrodes are obtained by a step of forming a first film having a predetermined pattern on the surface of one of the electrodes from a material repelling the high dielectric constant component liquid, and a step of forming a film from the high dielectric constant component liquid on the first film.

8. The method as claimed in claim 3, wherein
the step of filling the electric field application cell with the compound liquid includes the steps of:
    forming the droplets of the high dielectric constant component liquid on a surface of a first electrode of the electric field application cell;
    forming a layer of another one of the component liquids other than the high dielectric constant component liquid on a second electrode of the electric field application cell; and
    bonding the first electrode with the high dielectric constant component liquid formed thereon and the second electrode with the other one component liquid layer formed thereon.

9. The method as claimed in claim 3, wherein
the step of filling the electric field application cell with the compound liquid includes the steps of:
    forming the droplets of the high dielectric constant component liquid on a surface of a first electrode of the electric field application cell;
    forming a layer of another one of the component liquids other than the high dielectric constant component liquid on the droplets of the high dielectric constant component liquid; and
    bonding a second electrode of the electric field application cell on the layer of the other one component liquid.

10. The method as claimed in claim 1, wherein the component liquid that is an un-cured curable resin liquid is cured when being irradiated by rays of activation energy.

11. The method as claimed in claim 10, wherein the component liquid that is an un-cured curable resin liquid is an ultraviolet curable resin which is cured when being irradiated by ultraviolet rays.

12. The method as claimed in claim 1, wherein the component liquid that is an un-cured curable resin liquid is a thermal curable resin which is cured when heated.

13. The method as claimed in claim 1, wherein the compound liquid includes only two component liquids which are insoluble in each other and have dielectric constants different from each other.

14. The method as claimed in claim 1, wherein
the high dielectric constant component liquid is an un-cured curable resin liquid; and
a component liquid other than the high dielectric constant component liquid is removed after the curing.

15. The method as claimed in claim 1, wherein
a component liquid other than the high dielectric constant component liquid is an un-cured curable resin liquid; and
the high dielectric constant component liquid is removed after the curing.

16. The method as claimed in claim 1, wherein
the high dielectric constant component liquid is a first un-cured curable resin liquid;
a component liquid other than the high dielectric constant component liquid is a second un-cured curable resin liquid; and
the second curable resin liquid and the first curable resin liquid are cured in the curing.

17. The method as claimed in claim 1, wherein
the high dielectric constant component liquid is an un-cured curable resin;
a component liquid other than the high dielectric constant component liquid is a melt of a thermo-melting material that melts when heated; and
the curing includes curing the melt after the high dielectric constant component liquid is cured.

18. The method as claimed in claim 1, wherein
the high dielectric constant component liquid is an un-cured curable resin;
a component liquid other than the high dielectric constant component liquid is a melt of a thermo-melting material that melts when heated; and
the curing includes curing the melt before curing the high dielectric constant component liquid.

19. The method as claimed in claim 1, wherein
a component liquid other than the high dielectric constant component liquid is an un-cured curable resin liquid;
the high dielectric constant component liquid is a melt of a thermo-melting material that melts when heated; and
the curing includes curing the melt after the curable resin is cured.

20. The method as claimed in claim 1, wherein
a component liquid other than the high dielectric constant component liquid is an un-cured curable resin liquid;
the high dielectric constant component liquid is a melt of a thermo-melting material that melts when heated; and
the curing includes curing the melt before curing the high dielectric constant component liquid.

21. The method as claimed in claim 1, wherein the electric field between the electrodes is induced by an alternating current.

22. The method as claimed in claim 1, wherein the electric field between the electrodes is induced by a direct current.

* * * * *